United States Patent [19]

Hiramatsu et al.

[11] Patent Number: 5,182,702
[45] Date of Patent: Jan. 26, 1993

[54] INVERTER DEVICE

[75] Inventors: Akinori Hiramatsu, Ikoma; Futoshi Okamoto, Hirakata; Hiroshi Kido; Hiroyuki Sako, both of Moriguchi; Yukio Yamanaka, Kadoma; Koji Yamada, Sakai, all of Japan

[73] Assignee: Matsushita Electric Works, Ltd., Japan

[21] Appl. No.: 633,612

[22] Filed: Dec. 24, 1990

[30] Foreign Application Priority Data

Dec. 25, 1989 [JP] Japan ................................. 1-335332
Dec. 25, 1989 [JP] Japan ................................. 1-335334
Dec. 25, 1989 [JP] Japan ................................. 1-335336
Mar. 27, 1990 [JP] Japan ................................. 2-77802
Sep. 25, 1990 [JP] Japan ................................. 2-256181

[51] Int. Cl.$^5$ ..................................... H02M 7/537
[52] U.S. Cl. ..................................... 363/132; 363/37; 363/98; 363/47
[58] Field of Search .............. 363/37, 95, 98, 132, 363/44–48, 126

[56] References Cited

U.S. PATENT DOCUMENTS 4,564,897  1/1986  Okamoto et al. .................. 363/132

Primary Examiner—Steven L. Stephan
Assistant Examiner—Emanuel Todd Voeltz
Attorney, Agent, or Firm—Stevens, Davis, Miller & Mosher

[57] ABSTRACT

An inverter device has a full-wave rectifier providing a pulsating DC voltage from an input AC voltage, a smoothing circuit. The smoothing circuit includes a choke coil, a smoothing capacitor and a switching element chopping the pulsating DC voltage through the choke coil into a smoothed DC voltage at the smoothing capacitor. An inverter is included to have the element common to the smoothing circuit and operating to switch the smoothed DC voltage to apply a resulting voltage to a load circuit including a load, inductance and capacitor. The inductance and capacitor define an oscillation circuit providing to the load an oscillating current composed of first and second currents of opposite directions. The oscillating current alternating to flow for a nominal on-time duration determined by a circuit constant of the oscillation circuit itself. A controller is included to detect the termination of the second current and excites the common switching element at a timing dependent upon the termination of the second current so as to start flowing the first current. The controller includes a timer for separately controlling an actual on-time duration for flowing the first current within the nominal on-time duration, whereby enabling to regulate the accumulated DC voltage in the smoothing capacitor at a desired level by controlling to vary the actual on-time duration of the common switching element.

16 Claims, 18 Drawing Sheets

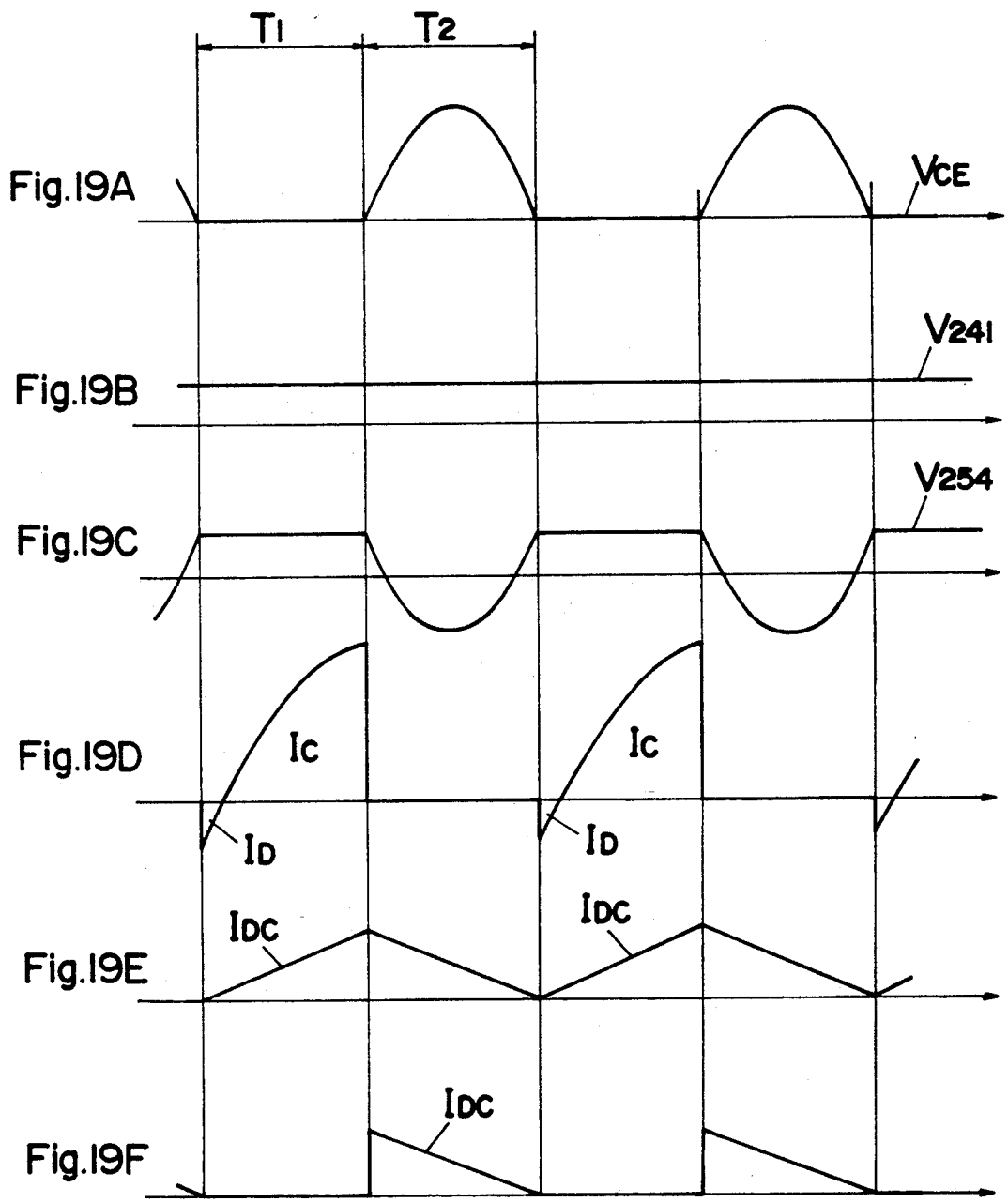

INVERTER DEVICE

BACKGROUND OF THE INVENTION

1. Fields of the Invention

The present invention is directed to an inverter device for converting an AC line voltage into a high frequency output AC voltage, more particularly to an improved inverter device capable of successfully varying an output energy in a simple control scheme.

2. Description of the Prior Art

A most closest prior art inverter device is disclosed in U.S. Pat. No. 4,564,897 issued on Jan. 14, 1986 which suggests to use one switching element in common to a smoothing circuit of obtaining a smoothed DC voltage and to an inverter switching thus obtained smoothed DC voltage to provide a high frequency AC voltage or current to a load. As shown in FIG. 1 depicting the prior art inverter device, the smoothing circuit 40' includes a smoothing capacitor 41', a choke coil 42' and a first switching transistor 51' which is connected in series with choke coil 42' and which acts to interrupt a pulsating DC voltage obtained through a full-wave rectifier 30' from an AC line voltage to supply choke coil 42' with electromagnetic energy when it is turned on. The electromagnetic energy is released at subsequent turn-Off of first transistor 51' to flow a resulting current into smoothing capacitor 41' for accumulating thereat the smoothed DC voltage. The inverter 50' includes the first switching transistor t1' common to the smoothing circuit 30', a second switching transistor 52,, a transformer 53' with a primary winding 54' and a secondary winding 55', and first and second capacitors 56' and 57'. First and second transistors 51' and 52' are connected in series across smoothing capacitor 41' and are driven to alternately turn on and off for switching the smoothed DC voltage at a high frequency so as to provide a high frequency AC current through primary winding 53', whereby providing a corresponding AC voltage for energizing a load 10' coupled through secondary winding 55' to primary winding 54'. Each of the first and second transistors 51' and 52' is cooperative with primary winding 54' and each one of first and second capacitors 56' and 57' to define a series oscillation circuit which produces an oscillating current allowed to flow in the oscillation circuit through each one of first and second diodes 55' and 59' connected antiparallel with first and second transistors 51' and 52' immediately upon turn off of first and second transistors 51' and 52'. The transformer 53' additionally includes first and second feedback windings 61' and 62' respectively connected to bases of first and second transistors 51' and 2' for self-excitation thereof by the oscillating current at such a timing that one of the switching transistors 51' and 52' is turned on after the other is turned off. In other words, one of the first and second transistors 51' and 52' will not turn on until the other transistor turns off to avoid simultaneous turn-on of the two switching transistors which would otherwise cause dangerous short-circuiting of the inverter device. Even with the advantageous features of the above prior art inverter device that the smoothing circuit and the inverter can share the first switching element and that the short-circuit hazard can be avoided, the prior art inverter device suffers from a critical problem resulting from the common use of the switching transistor. The problem is that it is practically difficult to regulate the inverter output at a desired level stably against a possible input AC voltage variation or in conformity with varying load requirements. For example, when the input AC voltage increases substantially, the smoothing circuit responds to accumulate a correspondingly increased smoothed DC voltage at the smoothing capacitor, which eventually results in an increased load current flowing through the common switching transistor for an extended time interval. The result is that the common switching transistor is kept turn on for such extended time interval, which in turn causes the smoothing circuit to draw more amount of current or energy from the rectifier, thereby further increasing the resulting smoothed DC voltage at the smoothing capacitor and accordingly the load current or energy to a further increased level. Also, when the input AC voltage drops substantially, the common switching transistor will act to ever reduce the load current in a manner opposite to the above, eventually reducing the load current to a further decreased level. In short, input AC voltage variation will be amplified to produce unduly increased or decreased load current. The above operational mechanism also makes it difficult to control the inverter output energy in accordance with the varying load requirement, since variation in the load current will go back into a corresponding variation in the inverter input energy which returns an amplified variation in the load energy. Because of the above circuit limitations, the prior art inverter device fails to successfully control the inverter output energy at a desired level.

SUMMARY OF THE INVENTION

The above problem has been successfully eliminated in the present invention while retaining the advantages of utilizing a switching element common to a smoothing circuit and to an inverter. It is therefore a primary object of the present invention to provide an improved inverter device which is capable of controlling the output energy at a desired level with a simplified circuit arrangement of using one switching element common to the smoothing circuit and the inverter.

The inverter device in accordance with the present invention comprises a full-wave rectifier for full-wave rectification of an input AC line voltage into a pulsating DC voltage, a smoothing circuit providing a smoothed DC voltage from the pulsating DC voltage, and an inverter operating to switch the smoothed DC voltage to provide a high frequency alternating voltage or current to a load. The smoothing circuit comprises a choke coil, a smoothing capacitor, and a switching element which is driven to switch the rectifier output at a high frequency to store electromagnetic energy in the choke coil when it is turned on and then release the energy into the smoothing capacitor when it is turned off, accumulating the smoothed DC voltage at the smoothing capacitor. In this manner, the switching element repeats chopping the rectifier output to constantly charge the smoothing capacitor therefrom.

The inverter comprises the switching element which is common to the smoothing circuit for switching the smoothed DC voltage accumulated at the smoothing capacitor to apply a resulting voltage to a load circuit. The load circuit includes the load, an inductance and an oscillation capacitor to define an oscillation circuit which provides to the load an oscillating current composed of first and second currents flowing through the load in opposite directions to each other for effecting an inverter operation. The first and second currents alternates to flow for a nominal on-time duration determined by a circuit constant of the oscillation circuit itself. An improvement resides to include a controller with a detector means for detecting the termination of the second current. The controller, in response to the detection of the termination of the second current, excites the common switching element to start flowing the first current. The controller has also includes timer means for separately controlling an actual on-time duration for flowing the first current within the nominal on-time duration following the on-time duration of the second current flow, while leaving the second current to flow for the fixed nominal on-time duration. Therefore, the on-time duration of the first current can be varied independently of the on-time duration of the second current, which enables to regulate the smoothed DC voltage developed at the smoothing capacitor at a desired level without accompanying significant variation in the inverter output or keeping an attendant variation to a minimum. Accordingly, it is readily possible in the present invention to control the smoothed DC voltage or the inverter input energy while keeping an attendance influence on the inverter output energy at a minimum and vice versa, which enhances flexibility of controlling to vary the input and output energy relatively independently in accordance with input voltage variations or varying load energy requirements.

In a preferred embodiment, the inverter includes a second switching element in addition to the first common switching element. The second switching element is connected in series with the first switching element across the smoothing capacitor. Connected across the second switching element is a load circuit which includes the load, an oscillation capacitor and inductance and define therewith a series oscillating circuit. As the first and second switching elements are driven to alternately turn on and off at a high frequency for switching the smoothed DC voltage accumulated at the smoothing capacitor, the series oscillating circuit responds to provide an oscillating current composed of first and second current flowing through the load in opposite directions to each other for effecting an inverter operation. The first and second currents alternate to flow for a nominal on-time duration determined by a circuit constant of the series oscillation circuit itself. The first switching element is responsible for switching the smoothed DC voltage to provide the first current in the series oscillation circuit while charging the oscillation capacitor thereby. The second switching element is connected to the series oscillation circuit to be selfexcited in response to the termination of the first current so as to start flowing the second current from the oscillation capacitor through the series oscillation circuit and to continue flowing the second current for a fixed time interval of nominal on-time duration. In other words, the second switching element is responsible for starting the second current at a timing dependent upon the termination of the first current of which duration is controlled by the controller, and for flowing the second current for a fixed time interval corresponding to the nominal on-time duration solely determined by the series oscillation circuit.

Therefore, it is also possible to control the on-time duration of the first current independently of the on-time duration of the first current, whereby enabling to regulate the smoothed DC voltage developed at the smoothing capacitor at a desired level without accompanying significant variation in the inverter output or keeping an attendant variation to a minimum. In this embodiment utilizing two switching elements, because of that the first common switching element is separately excited by the controller only after the termination of the second current and that the second switching element is self-excited only after the termination of the first current, there can be no potential hazard of simultaneously turning on the first and second switching elements which are connected in series across the smoothing capacitor, whereby preventing hazardous short-circuiting.

It is therefore another object of the present invention to provide an improved inverter device which is capable of eliminating the hazardous short-circuiting in the inverter of utilizing two switching elements, yet retaining the above advantageous features.

In one embodiment, the controller has a control DC voltage smoothed from the output DC voltage of the rectifier in a proportional relationship thereto. The timer means, in response to a deviation of the level of the control DC voltage from a standard level, producing a duration signal which varies the actual on-time duration of the common switching element in inverse proportion to the deviation in a direction of keeping the smoothed DC voltage at a constant level. Therefore, the inverter device can compensate for possible variation in the input AC voltage received at rectifier to keep the smoothed DC voltage, i.e., the input DC voltage to the inverter at a constant level, thereby assuring to give a stabilized inverter output to the load without being influenced by the input AC voltage variation.

It is therefore another object of the present invention to provide an improved inverter device which is capable of producing a constant stabilized inverter output to the load free from possible variation in the input AC voltage.

Preferably, the inverter device of the present invention includes an input AC voltage detector connected in circuit to detect the input AC voltage applied to the rectifier and to provide a cut signal to the timer means when the detected AC voltage falls below a fixed reference voltage. The timer means, in response to the cut signal, produces a duration signal of reducing the actual on-time duration of the common switching element. Without this arrangement, when an input AC voltage fails or drops momentarily to a considerable extent, the common switching element responds to turn on for a correspondingly extended time interval due to the above controlled operation that the timer means responds to extend the on-time duration as the input AC voltage reduces, resulting in an excessively increased smoothed DC voltage developed at the smoothing capacitor which would cause the inverter to provide abnormal oscillation harmful to the inverter as well as the load.

Accordingly, the above arrangement provides a safeguard against momentary failure of or momentary critical drop in the input AC voltage to ensure a stable inverter operation, which is therefore a further object of the present invention.

These and still other objects and advantageous features of the present invention will become more apparent from the following detailed description of the embodiments when taken in conjunction with the attached drawings.

BRIEF DESCRIPTION OF THE DRAWINGS

FIGS. 19(A-F) are wave-forms illustrating an operation of the circuit of FIG. 18.

DETAILED DESCRIPTION OF THE PREFERRED EMBODIMENTS

First Embodiment

Figure 1:
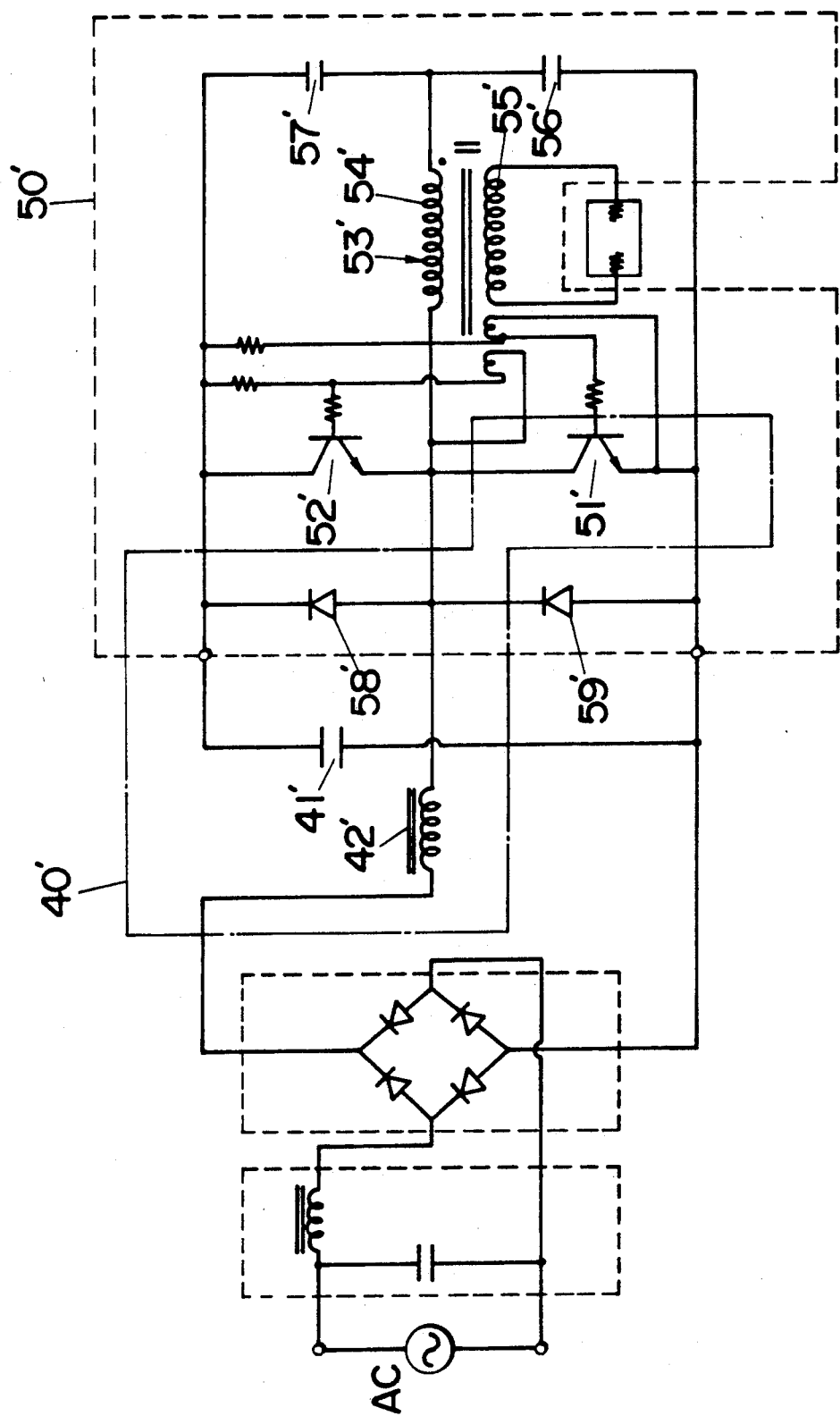
FIG. 1 is a circuit diagram illustrating a prior art inverter device.
Figure 2:
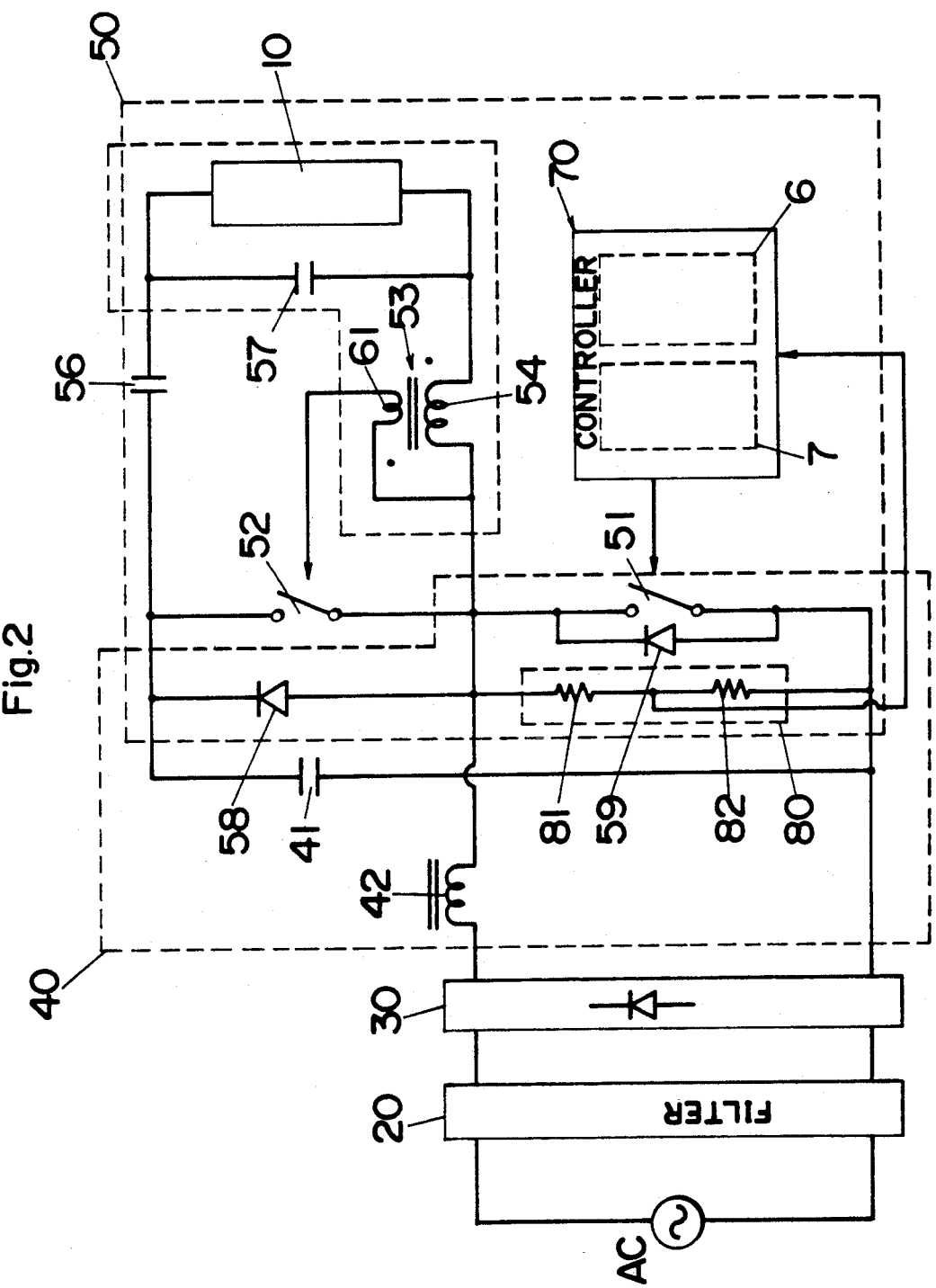
FIG. 2 is a schematic diagram of an inverter device in accordance with a first embodiment of the present invention.
Figure 3:
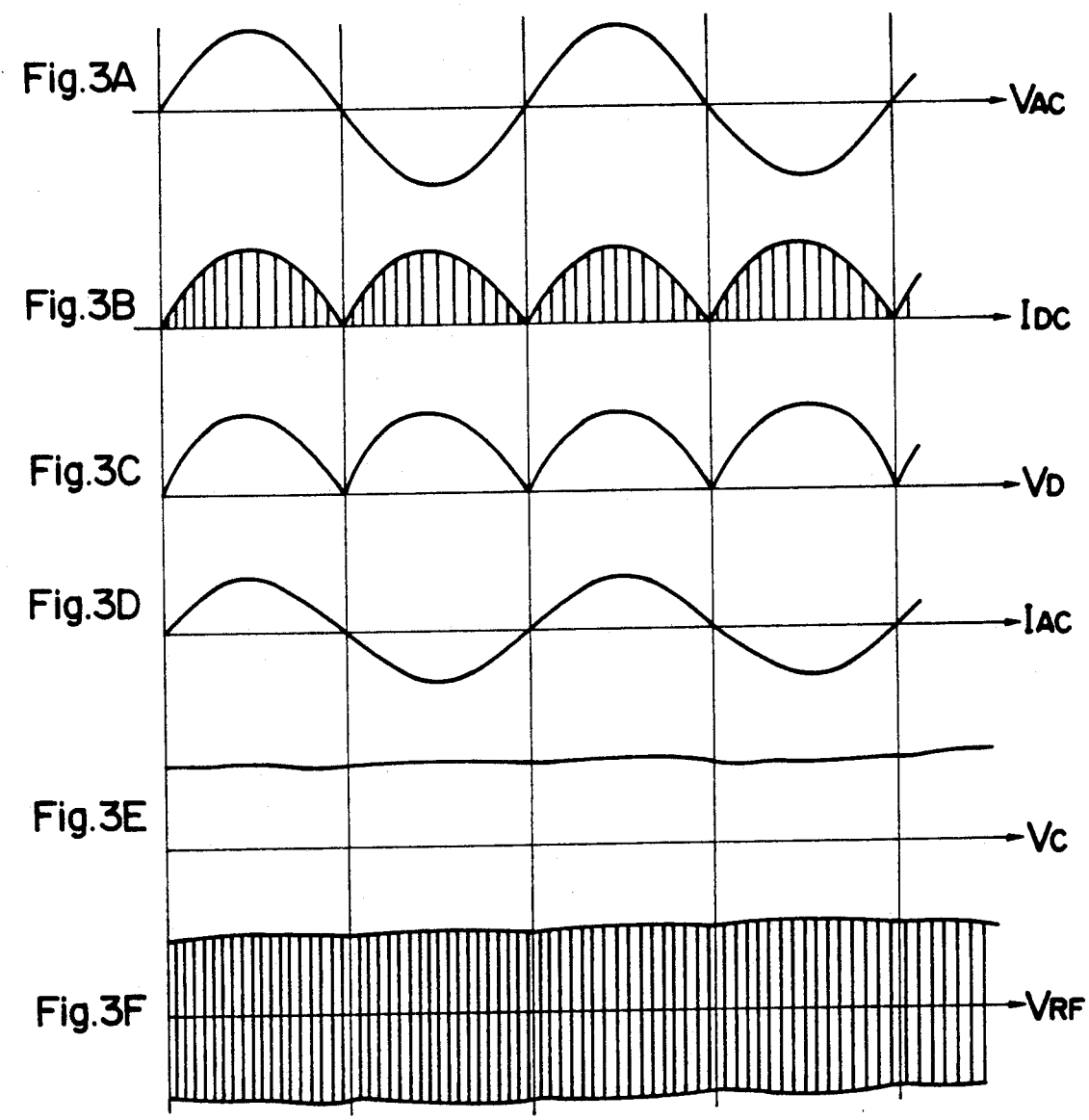
FIGS. 3(A-F) are wave-forms illustrating a basic operation of the circuit of FIG. 2.

Referring now to FIGS. 2 and 3, there is shown in schematic representation of a basic arrangement and operation of an inverter device in accordance with a first embodiment of the present invention. The inverter device comprises a full-wave rectifier 30' a smoothing circuit 40 and an inverter 50. The rectifier 30 receives an input AC line voltage VAC (FIG. 3A) through a filter 20 to provide a pulsating DC voltage VD (FIG. 3C) which is then applied to the smoothing circuit 40 where it is smoothed into a smoothed DC voltage Vc (FIG. 3E) with reduced ripples. The inverter 50 operates to switch the smoothed DC voltage at a high frequency of 20 KHz or more to provide a high frequency AC voltage VRF; (FIG. 3F) for driving a load 10, for example, a discharge lamp. Output DC current IDC from rectifier 30 and input AC current IAC are also shown in FIGS. 3B and 3D.

The smoothing circuit 40 comprises a smoothing capacitor 41, a choke coil 42, a first switching transistor 51 and a first diode 58. Choke coil 42 and first switching transistor 51 are connected in series across smoothing capacitor 41, while smoothing capacitor 41 and first diode 58 are connected in series across first switching transistor 51. First switching transistor 51 operates to periodically switch or chop the pulsating DC voltage from rectifier 30 to store choke coil 42 with electromagnetic energy upon turn on of transistor 51 and then release the energy through first diode 58 into smoothing capacitor 41 upon subsequent turn-off to thereby accumulate the smoothed DC voltage to smoothing capacitor 41. In this sense, the smoothing circuit 40 may be termed as a chopper circuit as it chops the pulsating DC voltage into the smoothed DC voltage.

The inverter 50 comprises first switching transistor 51 and a second switching transistor 52 which are connected in series across the smoothing capacitor 41 and which are alternately turned on and off so as to apply an oscillating voltage or current from the smoothed DC voltage to a load circuit including load 10. First transistor 51 is shunted by a second diode 59 in an anti-parallel relation thereto, in the like manner as second transistor 52 is shunted by first diode 58. Also included in the load circuit are a transformer 53 with a primary winding 54 and a secondary winding 55, a first oscillation capacitor 56 and a second capacitor 57. Primary winding 54, first oscillation capacitor 56 are connected in series with load 10 to define a series oscillation Circuit connected across second transistor 52 with second capacitor 57 connected across load 10. Secondary winding 55 defines itself a feedback winding connected to a base of second transistor 52 for self-excitation thereof, the details of which will be discussed hereinafter. A controller 70 is connected in circuit to turn on the first transistor 51 at a timing dependent upon the turn-off timing of second transistor 52 as well as to separately control an on-time duration of first transistor 51.

Figure 4:
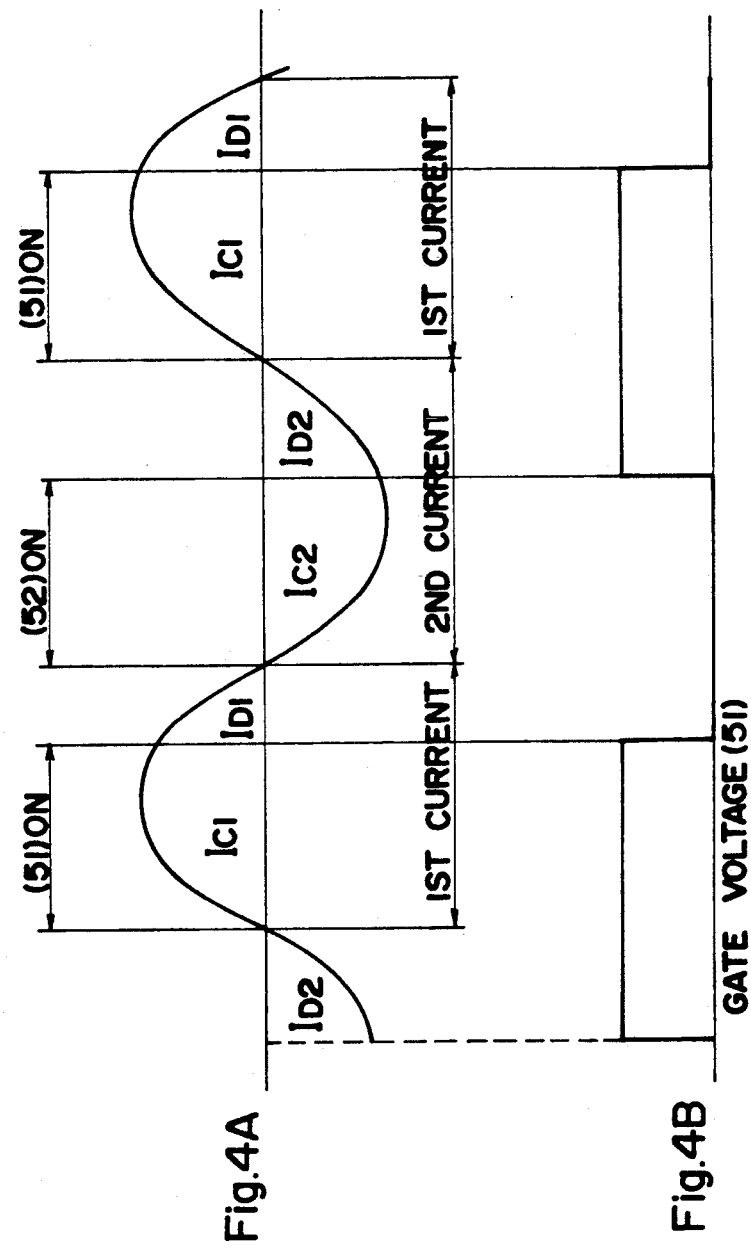
FIGS. 4(A and B) are diagrams illustrating an oscillation current flowing through the circuit of FIG. 2.

Operation of the inverter 50 will be now explained with reference to FIG. 4 schematically illustrating a current flowing through the circuit.

1) Upon turn-on of first transistor 51, a current Ir1 [first current] is caused to flow from smoothing capacitor 41 through a loop of the oscillation circuit, i.e., capacitor 56, load 10, capacitor 57, primary winding 54, first transistor 51, and back to smoothing capacitor 41, while charging capacitor 57 by that current.

2) Upon subsequent turn-off of first transistor 51, primary winding 54 or inductor acts to continue flowing a current ID1 in the same direction now through first diode 58 to capacitor 56, while at the same time primary winding 54 responds to collapse an electromagnetic field therearound for developing at feedback winding 61 a positive voltage applied to the base of second transistor 52 for self-excitation thereof. The winding sense of windings 55 and 61 is indicated in FIG. 4 by means of polarity dots. Accordingly, immediately after no further current flows through first diode 58 into first capacitor 56, second transistor 52 becomes conductive to flow a current IC2 from capacitor 56 through second transistor 52, primary winding 54, load 10 and capacitor 57, and back to capacitor 56.

3) When the current IC2 flows to a point where it induces no further expanding magnetic field around primary winding 54, the voltage developed across feedback winding 61 is reduced to zero. At this moment, a collector current IC2 of second transistor 52 reaches hfe times a base current thereof so that second transistor 52 becomes unsaturated and thereby turned off.

4) Immediately after second transistor 52 is turned off, primary winding 54 acts also to continue flowing current ID2 through load 10, capacitor 57, capacitor 56, smoothing capacitor 41, and through second diode 59 across first transistor 51, which condition is monitored at the controller 70. As will be discussed hereinafter, the controller 70 operates in response to the termination of that current ID2, to turn on first transistor 51 for a limited time interval.

In this manner, the above steps are repeated so that the oscillating circuit can provide an oscillating current composed of first and second currents flowing in the opposite directions with a nominal on-time duration determined by a circuit constant of the oscillating circuit itself. As shown in FIG. 4, the first current consists of current Ic1 flowing through first transistor 51 and current flowing through first diode 58 immediately after the turn-off of first transistor 51, while second current consists of current IC2 flowing through second transistor 52 and current ID2 flowing through second diode 59 immediately after the turn-off of second transistor 52.

A voltage divider 80 of resistors 81 and 82 is connected in series with choke coil 42 across the rectifier 30 in a parallel relation to first transistor 51 so as to provide to the controller 70 a divided voltage V82 which is proportional to the pulsating DC voltage at rectifier output. Each time the divided voltage V82 falls below a threshold voltage Vth, the controller 70 produces a start signal triggering first transistor 51 to be ready for turning on, so that it becomes conductive to flow current IC2 immediately after current ID2 of opposite direction becomes zero. In this manner, first transistor 51 is excited at a timing dependent the termination of current ID2, or second current, in the like manner as second transistor 42 does dependent upon the termination of current ID1 or first current. In this sense, despite that first transistor 51 is separately controlled to vary its on-time duration, the first and second transistors 51 and 52 are excited in a dependent relation to each other. This means that two transistors will be never turned on simultaneously which would result in harmful short-circuiting.

The controller 70 is designed to vary the on-time duration of first transistor 51, i.e., current Ic1 only within a nominal on-time duration determined by the oscillation circuit in order to vary the amount of current Ic1, while keeping the amount of second current at a constant level determined by the oscillation circuit. Thus, it is possible to vary the on-time duration of first current only for increasing and decreasing energy or voltage accumulated in smoothing capacitor 41 due to the chopper operation of first common transistor 51 independently of the output energy resulting from the second current, i.e. without accompanying critical variation in the overall output energy from the oscillating current.

Figure 5:
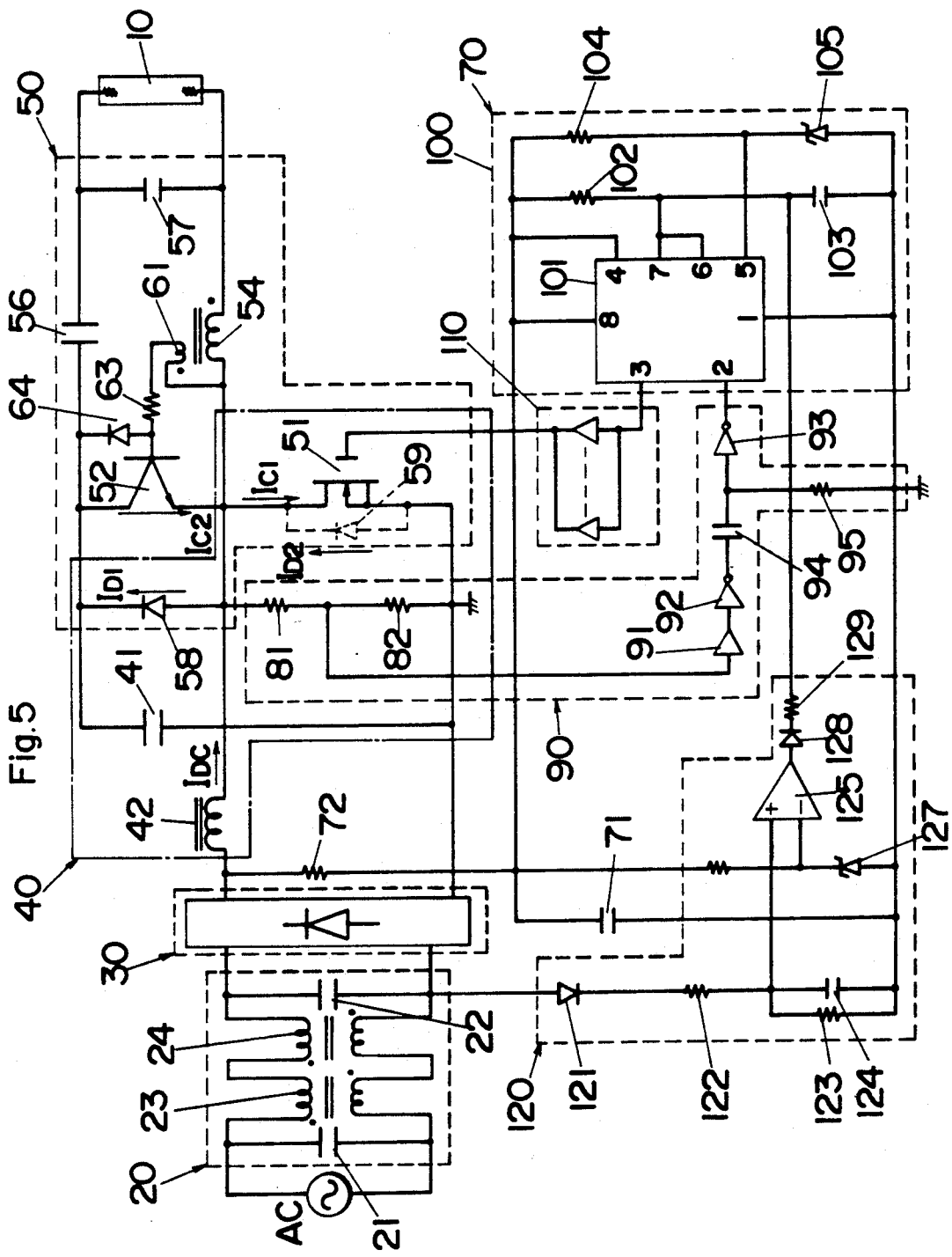
FIG. 5 is a detailed circuit diagram of FIG. 2.

FIG. 5 shows a detailed circuit arrangement of the controller 70 with associated circuits for the inverter device of FIG. 2. In the circuit, first transistor 51 is a MOSFET with a parasitic diode defining the second diode 59, while second transistor 52 is a bipolar N-P-N junction transistor having P-N junction across its base and collector. Also in the circuit, feedback winding 61 is connected across a base-emitter path of second transistor 52 with a resistor 63 connected between the base of second transistor 52 and feedback winding 61. As shown in the figure, the controller 70 comprises a starter circuit 90, a main control unit 100, drive unit 110, an input voltage detector 120, and a capacitor 71 which is connected through a resistor 72 to rectifier 30 so as to provide a control DC voltage V71 for energizing the main control unit 100.

The main control unit 100 comprises a mono-stable multi-vibrator 101 With a timer IC [for example, μPC1555 available from NEC, Japan] which produces an output pulse at output terminal (pin no. 3) for turning on and off first transistor 51 upon receiving a low going start signal at trigger input terminal (pin no. 2) from the starter circuit 90. A series connected pair of timing resistor 102 and capacitor 103 is connected across capacitor 71 so as to provide voltage of capacitor 103 to a threshold terminal (pin no. 6) and discharge terminal (pin no. 7) for determination of a width of the output pulse and therefore the on-time duration of first transistor 51. Another series connected pair of resistor 104 and zener diode 105 is connected across capacitor 71 to provide a fixed voltage V5 to frequency control terminal (pin no. 5). In this sense, multivibrator 101 acts as a timer for determining on-time duration of first transistor 51, which duration Can be externally varied by selecting values of timing resistor 102 and capacitor 103. Therefore, in the case that the load is a discharge lamp, it is readily possible to control light intensity of the lamp or dimming by suitably selecting values for capacitor 102 and resistor 103.

The starter circuit 90 comprises, in addition to the voltage divider 80, a wave-shaping buffer 91 (for example, μPC4050 available from NEC, Japan), invert gates 92 and 93 (for example, μPC4049 available from NEC, Japan), and differentiation circuit composed of capacitor 94 and resistor 95. Divided voltage V82 output from the voltage divider 80 as indicative of the pulsating DC voltage is applied to buffer 91 with the threshold voltage Vth. As shown in FIG. 6A, in response to divided voltage V82 being lower than threshold voltage Vth, buffer 91 provides an output voltage V91 (FIG. 6B) which is differentiated and inverted to provide to trigger input terminal (pin no. 2) of multi-vibrator 101 an output voltage V93 (FIG. 6C) which goes low each time the divided voltage V82 falls below threshold voltage Vth. Multivibrator 101, in response to such low going triggered input, generates high-level output (FIG. 6D) for an time interval determined by timing resistor 102 and capacitor 103. Thus obtained high level output is then processed at drive unit 110 comprising current amplifying IC (for example, μPC4050 available from NEC, Japan) into an amplified voltage applied to gate of first transistor or MOSFET 51.

Figure 6:
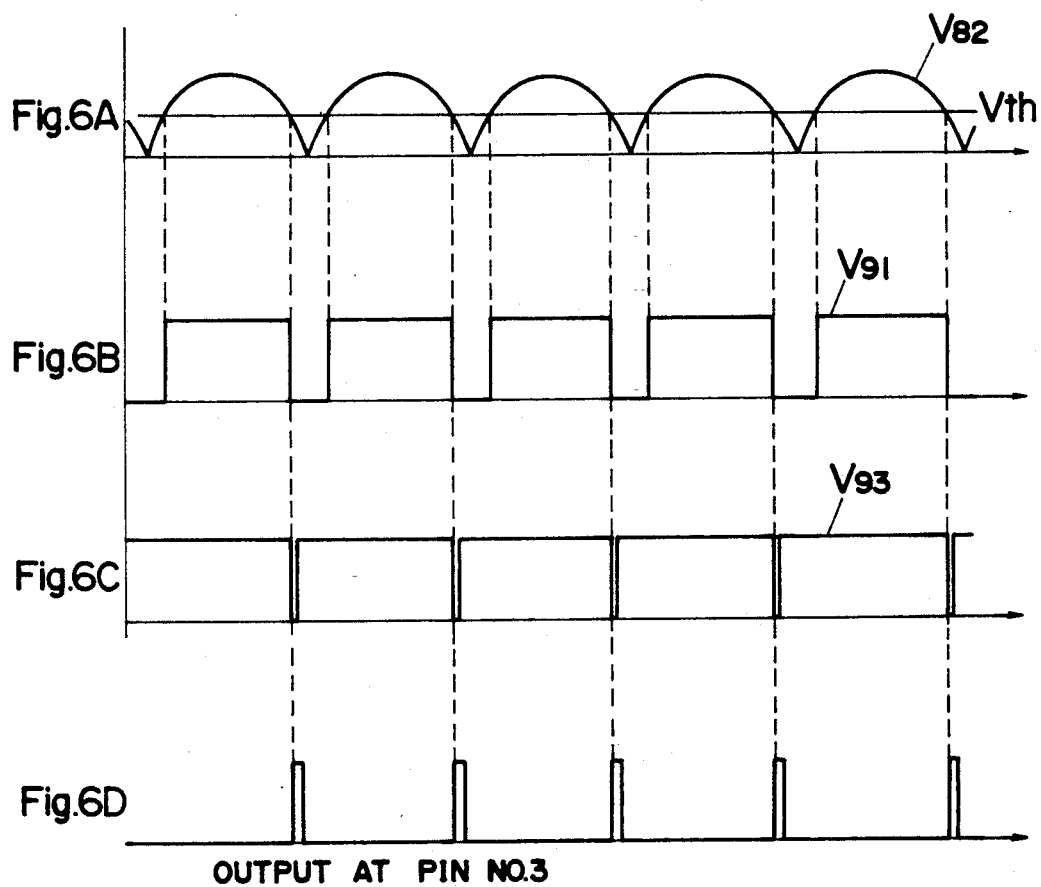
FIGS. 6(A-D) are wave-forms illustrating an operation of starting the inverter circuit of FIG. 5.
Figure 7:
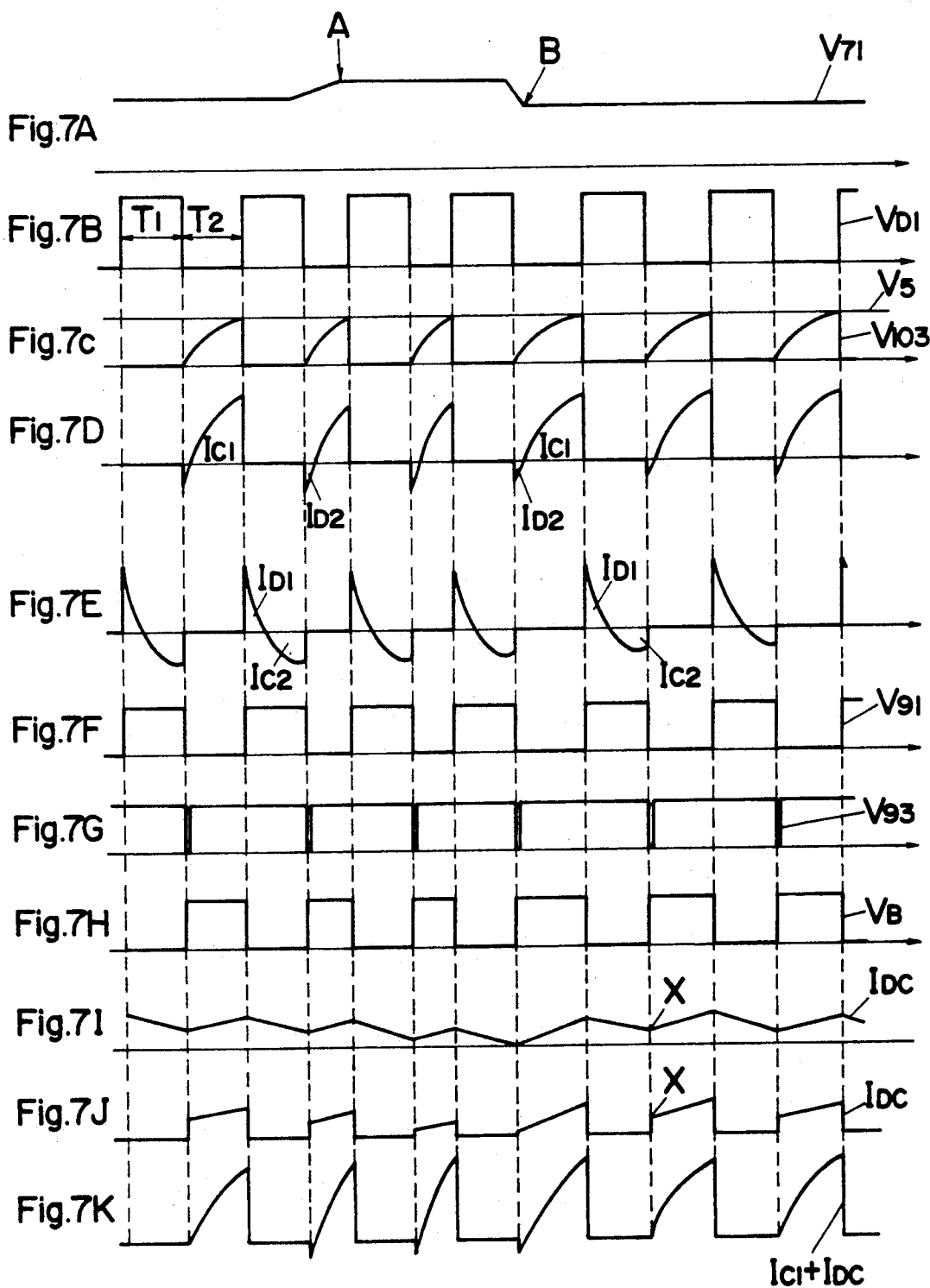
FIGS. 7(A-K) are wave-forms illustrating a high frequency operation of the circuit of FIG. 5.

The above inverter operation of the circuit of FIG. 6 will be confirmed with reference to FIG. 7 composed of FIGS. 7A to 7K and FIG. 8 composed of FIGS. 8A to 8E in which voltages and currents at various points in the circuit are shown in wave-forms to illustrate high frequency operation of the circuit.

FIG. 7A is for illustration of the control voltage V71 applied to the controller 70 as representative of rectifier output voltage;

FIG. 7B for voltage VD1 applied across MOSFET 51 with time period indications T1 within which MOSFET 51 is off (second transistor 52 is on) and T2 within which MOSFET 51 is on (second transistor 52 is off);

FIG. 7C for input voltage V5 at frequency control terminal (pin no. 5) of multi-vibrator 101 and charge-and-discharge voltage V103 input to threshold terminal (pin no. 67) and discharge terminal (pin no. 7) of multi-vibrator 101;

FIG. 7D for forward current IC1 through MOSFET 51 and opposite current ID2 through parasitic diode 59 of MOSFET 51, respectively;

FIG. 7E for current IC2 and current ID1 respectively through second transistor 52 and diode 58 in the opposite directions;

FIG. 7F for output voltage V91 of buffer 91;

FIG. 7G for output voltage V93 of starter circuit 90;

FIG. 7H for voltage bias V8 to the gate of MOSFET 51;

FIG. 7I for current IDC flowing through choke coil 42 resulting from the chopping operation of MOSFET 51;

FIG. 7J for current IDC flowing through MOSFET 51;

FIG. 7K for a composite current (IC1 plus IDC) flowing through MOSFET 51;

FIG. 8A for voltage VD1 applied across MOSFET 51 with time period indications T1 within which MOSFET 51 is off (second transistor 52 is on) and T2 within which MOSFET 51 is on (second transistor 52 is off);

FIG. 8B for voltage V82 across resistor 82;

FIG. 8C for output V61 induced at feedback winding 61;

FIG. 8D for current IC1 through MOSFET 51 and opposite current ID2 through second diode 59; and FIG. 8E for current IC2 through second transistor 52 and current ID1 through first diode 58.

Figure 8:
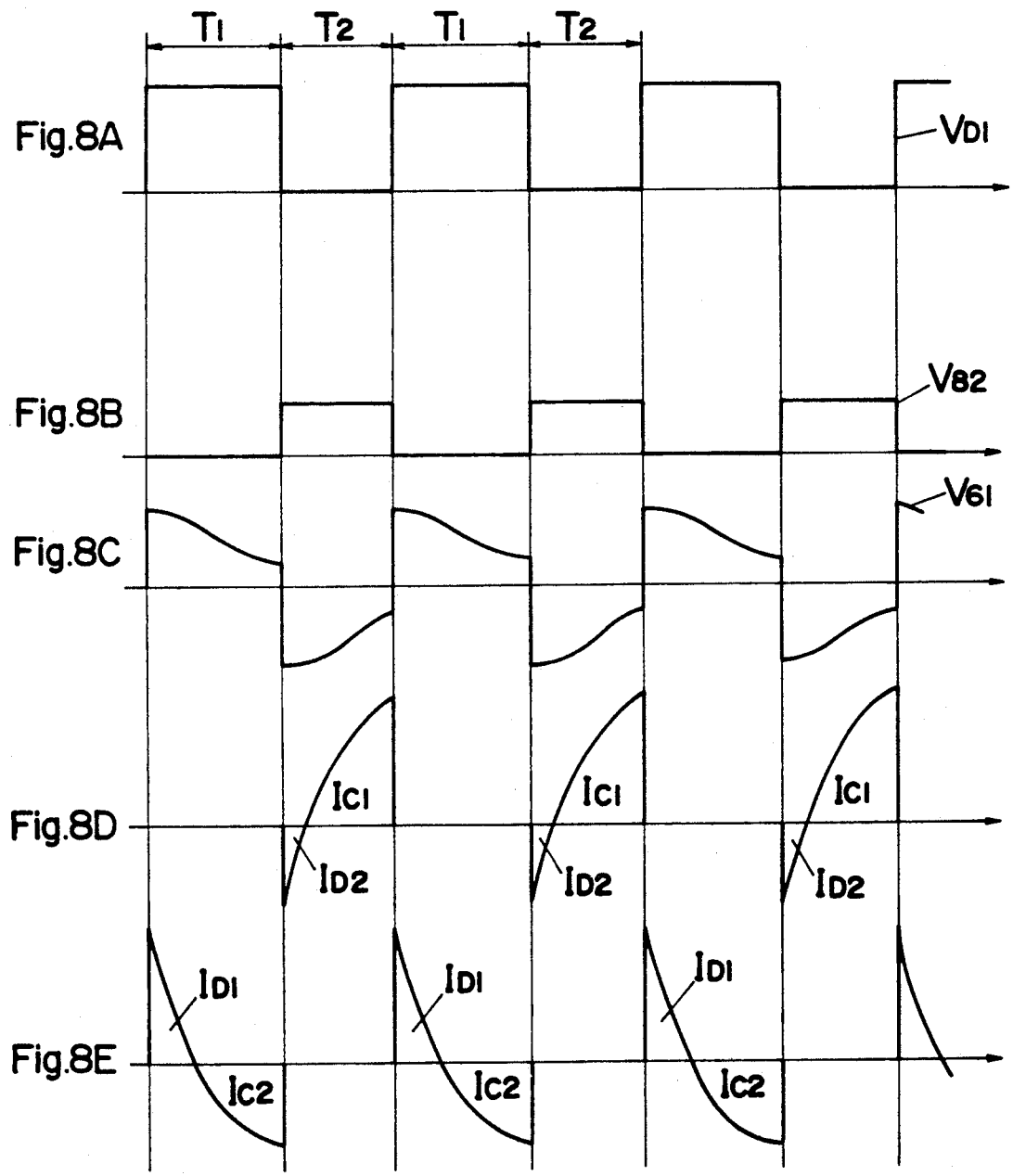
FIGS. 8(A-E) are other wave-forms illustrating a high frequency operation of the circuit of FIG. 5.

The inverter operation will be now repeated with reference to FIGS. 7 and 8, and also to FIG. 5. Upon receiving input AC voltage, pulsating DC voltage from rectifier 30 is applied through choke coil 42 to voltage divider 80 across MOSFET 51 so as to provide a resulting divided voltage V82. When divided voltage V82 falls below threshold voltage Vth, starter circuit 90 responds to issue a start signal to multi-vibrator 101 for triggering MOSFET 51 in a manner as described hereinbefore. Whereby, MOSFET 51 is turned on for a time interval determined by timing resistor 102 and capacitor 103. Upon turn-on of MOSFET 51, current IC1 from smoothing capacitor 41 is caused to flow through series oscillation circuit of first capacitor 56, load 10, second capacitor 57, primary winding 54, MOSFET 51, and back to smoothing capacitor 41 (FIGS. 7D and 8D) while charging first capacitor 56, during which feedback winding 61 acts to apply a reverse bias to second transistor 52 to keep it turned off. When MOSFET 51 is turned off after an elapse of time interval determined by the controller 70, primary winding 54 acts to continue flowing current ID1 in the same direction through first diode 58 into first capacitor 56 (FIGS. 7E and 8E). At this occurrence, primary winding 54 seeing decreased current ID1 responds to collapse magnetic field so as to induce a positive voltage across feedback winding 61 which is applied through resistor 63 to bias second transistor 52. After current ID1 becomes zero, therefore, thus self-excited second transistor 52 is in turn conductive to flow current IC2 in the opposite direction from first capacitor 56 through series oscillation circuit of primary winding 54, load 10, second capacitor 57, and back to first capacitor 56 (FIGS. 7E and 8E) until it is self-extinct in the manner as explained hereinbefore. Immediately after such automatic turn-off of second transistor 52, primary winding 54 then acts to continue flowing current ID2 in the same direction through oscillation circuit of load 10, second capacitor 57, first capacitor 56, and through smoothing capacitor 41, second diode 59 (FIG. 7D and 8D). Because of the presence of such current ID2 flowing through second diode 59, drain voltage of MOSFET 51 becomes zero so that voltage divider 80 provides to buffer 91 a low level output instead of pulsating DC voltage, causing invert gate 93 of differentiation circuit 94 and 95 to generate a low level output to trigger terminal (pin no. 2) of multi-vibrator 101. Thus, multi-vibrator 101 is triggered to generate a drive signal at output terminal (pin no. 3) which is amplified through drive unit 110 to give a forward bias to MOSFET 51 to make it ready for conduction. Therefore, immediately after current ID2 becomes zero, MOSFET 51 responds to flow current IC1 again from smoothing capacitor 41 through oscillation circuit, MOSFET 51 and back to smoothing capacitor 41. Therefore, the same steps are repeated for continuously producing the oscillating current to effect inverter operation of driving the load 10 with that oscillating current. It is noted that when MOSFET 51 conducts, it receives a composite current of oscillating current IC1 flowing through oscillation circuit plus current IDC flowing from rectifier 30 through choke coil 42. When MOSFET 51 becomes non-conductive, first diode 58 receives a composite current of oscillating current ID1 plus current IDC from choke coil 42.

When AC line voltage fluctuates by some reason to increase its effective voltage, for example, up to 110%, control voltage V71 is also increased by about 10%, as indicated at point A in FIG. 7A. At this occurence, although voltage V5 being applied to frequency control terminal (pin no. 5) remains fixed due to zener diode 105, capacitor 103 will be charged up to voltage V5 in a correspondingly shortened period with such increased control voltage V71, as seen in FIG. 7C. As soon as voltage V103 of capacitor 103 reaches voltage V5, discharge terminal (pin no. 7) is turned on, allowing capacitor 103 to discharge and turning output terminal (pin no. 3) to low level for turning off MOSFET 51. Therefore, MOSFET 51 is to be turned off shortly with the increase in control voltage V71 or input AC voltage. With this result, MOSFET 51 has a shortened on-time duration so as to correspondingly decrease electromagnetic energy being stored in choke coil 42 and eventually voltage accumulated at smoothing capacitor 41, and at the same time such shortened on-time duration of MOSFET 51 acts to correspondingly prompt the subsequent turn-on of second transistor 52 to thereby increase effective oscillating frequency of the inverter. Consequently, the inverter output energy is lowered because of that the inverter receives such decreased voltage from the smoothing capacitor 41 and also because of that the increased frequency results in reduced output energy by the presence of primary winding 54 connected in series with load 10, which makes it possible to keep the output energy stably at a desired level against such input voltage increase.

When, on the other hand, effective input AC voltage is decreased, for example, down to 90%, control voltage V71 is also correspondingly decreased by about 10%, as indicated at point B in FIG. 7A. Upon this occurrence, capacitor 103 is charged up to voltage VD1 in a correspondingly elongated period with such decreased control voltage V71, as seen in FIG. 7C, thereby delaying the turn off of MOSFET 51 with the decrease in control voltage V71 or input AC voltage. With this result, MOSFET 51 has an extended on-time duration so as to correspondingly increase electromagnetic energy being stored in choke coil 42 and eventually voltage accumulated at smoothing capacitor 41, and at the same time such extended on-time duration of MOSFET 51 acts to correspondingly delay the subsequent turn-on of second transistor 52 to thereby lower effective oscillating frequency of the inverter. Thus, the inverter output energy is increased because of that the inverter receives such increased voltage from the smoothing capacitor 41 and also because of that the lowered frequency results in increased output energy by the presence of primary winding 54 connected in series with load 10, which makes it possible to keep the output energy stably at a desired level against such input voltage reduction. In this manner, the controller 70 acts to compensate for possible fluctuation in input AC voltage, assuring to drive the load stably at a desired output energy level. It should be noted at this time that on-time duration is controlled within the nominal on-duration period inherently given to the oscillating current.

The inverter device of the present embodiment additionally includes an input voltage detector 120 connected to the output of the filter 20 forwardly of rectifier 30. Input voltage detector 120 comprises diode 121, resistor 122, and parallel combination of resistor 123 and capacitor 124 which are connected in series across the filter 20 to provide a detected voltage V124 of which level is in proportion to the input AC line voltage. Detected voltage V124 is applied to noninverting input of a comparator 130 which receives at its inverting input a fixed reference voltage V127 obtained from zener diode 127 connected in series with resistor 126 across capacitor 71 providing the control voltage V71. Comparator 125 is made from a conventional operational amplifier, for example, available from NEC, Japan as µPC451, and has its output connected through diode 128 and resistor 129 to one end of timing capacitor 103 of the controller 170. The filter 20 comprises capacitors 21, 22 and transformers 23, 24 to exhibit low impedance with respect to commercial AC line frequency of 50 or 60 Hz and exhibit high impedance with respect to switching frequency of MOSFET 51 such that switching current flowing through the smoothing circuit is smoothed to thereby approximate the input AC current into sinusoidal wave.

Operation of input voltage detector 120 will be now explained. Input voltage detector 120 is set to produce a low level output for variations of about ±10% in input AC line voltage. When input AC line voltage temporarily fail or decrease critically by over 10%, detected voltage v124 at capacitor 124 is reduced to be less than reference voltage V127 at zener diode 127 so that comparator 125 has its output inverted from "low level" to "high level" so as to rapidly Charge capacitor 103 through diode 128 and resistor 129. This causes multivibrator 101 to generate at its output terminal (pin no. 3) high level signal only for a shortened time interval, therefore reducing on-time duration of MOSFET 51 to a minimum in compensation for such temporarily failure or critical drop in the input AC line voltage, assuring to continue normal inverter operation. Without this safe guard, timing capacitor 103 would be charged up to voltage V103 over a very prolonged time or fail to be charged up to that voltage due to corresponding drop in control voltage V71 applied to capacitor 103, resulting in very prolonged on-time interval of MOSFET 51. If this occurs, choke coil 42 receives unduly increased energy Which will not released enough at the subsequent turn off of MOSFET 51, so that remaining energy acts to continue flowing current IDC upon turning off of second switching transistor 52 (marked by X in FIGS. 7I and 7J), which current IDC is in additive relation to oscillating current ID2 (FIG. 7D) of opposite direction resulting from the inverter operation to thereby cancel the oscillating current ID2. With this consequence, diode 59 sees no current to thereby cause no voltage drop in voltage V82 of voltage divider 82, failing to trigger multi-vibrator 101 in dependence upon the turn-off timing of second transistor 52 or ceasing the inverter, but rather rendering starter circuit 90 to trigger multi-vibrator 101 in response to pulsating DC voltage from rectifier 30. The result is that the inverter would repeat started and ceased in a random fashion causing abnormal and harmful inverter oscillation. Such abnormal inverter oscillation, however, can be successfully avoided in the present embodiment with the input voltage detector 120 for the reason as discussed in the above.

Figure 9:
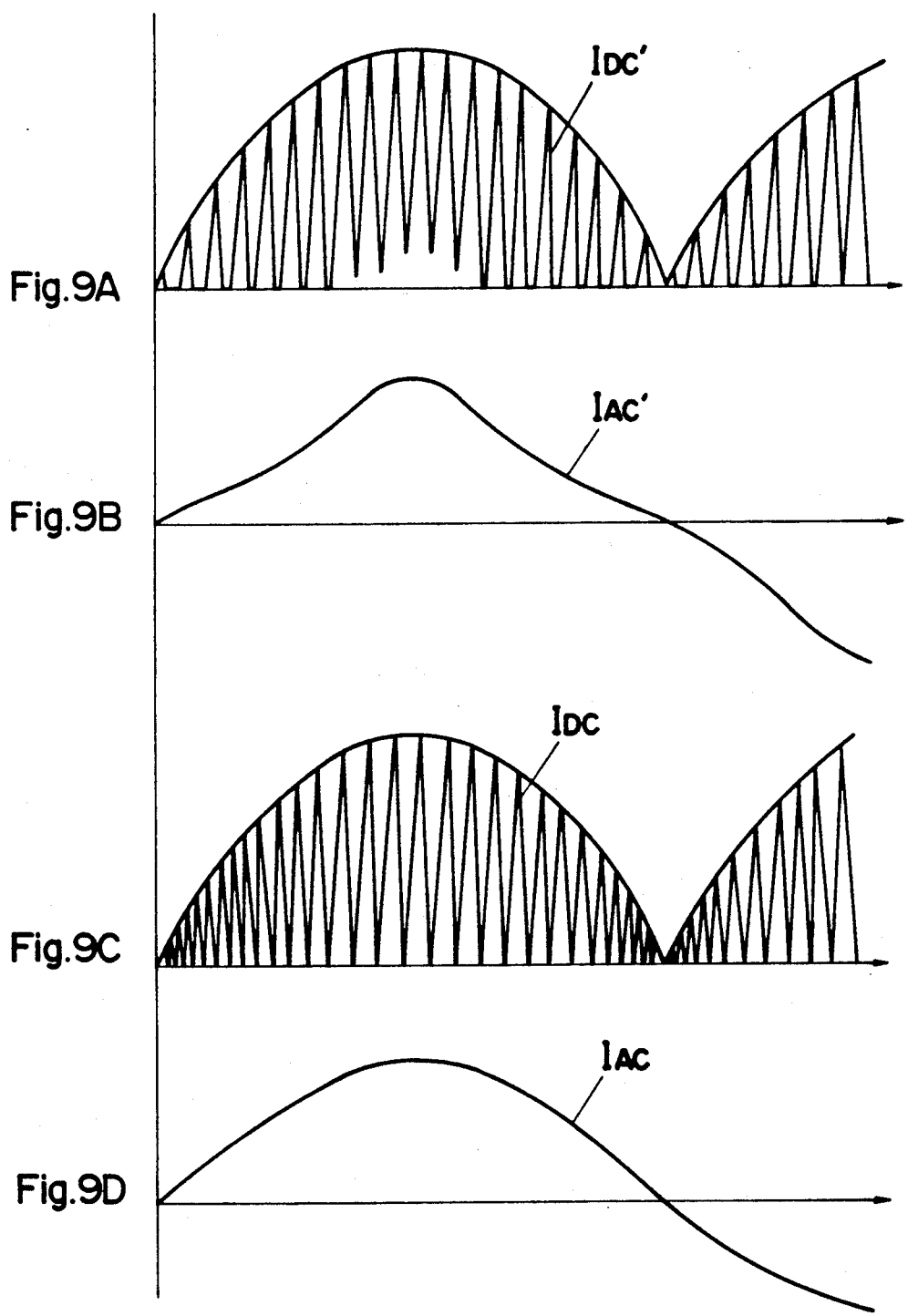
FIGS. 9(A-D) are wave-forms illustrating currents flowing through an choke coil and corresponding input AC current to a rectifier of the circuit of FIG. 5.

In the circuit of FIG. 5, feedback winding 61 is cooperative with P-N junction formed between base and collector of second transistor 52 which is a bipolar N-P-N junction transistor so as to define an additional path through which a fraction of current IDC from choke coil 42 is allowed to flow into smoothing capacitor 41, as deviated from the course through first diode 58, upon turn off of MOSFET 51. When input AC voltage temporarily increases, choke coil 42 receives correspondingly increased energy which in turn provides increased current IDC flowing through first diode 58 as well as through the additional path of feedback winding 61 and P-N base-collector junction of second transistor 52. Since while the fraction of current IDC flows through base-collector path of second transistor 52, second transistor 52 is inhibited from being made conductive to flow current IC2 from first capacitor 56, which results in delayed excitation of second transistor 52 and therefore in decreased inverter switching frequency. In other words, the inverter switching frequency can vary automatically in response to instantaneous voltage fluctuation of pulsating DC voltage from rectifier 30 within one cycle thereof such that, as shown in FIG. 9C, chopped current IAC' flowing through choke coil 42 exhibit a wave-form with no substantial break (or with substantially equal-width of break), resulting in improved power factor. This is very in contrast to FIG. 9A illustrating wave-form of like chopping current IDC seen in the prior art inverter device. In this connection, since input AC current IAC is considered as current IDC being averaged through filter 20, it can be shaped into a nearly sinusoidal wave-form with less higher harmonics, as shown in FIG. 9D, which is also in very contrast to FIG. 9B illustrating waveform of input AC current IAC' for prior art inverter device. An additional diode 64 may be connected across base-collector junction of second transistor 52 which defines a second additional path diverting another fraction of current IDC from choke coil 42 into smoothing capacitor 41 in order to attenuate the above effect for optimum performance.

Second Embodiment

Figure 10:
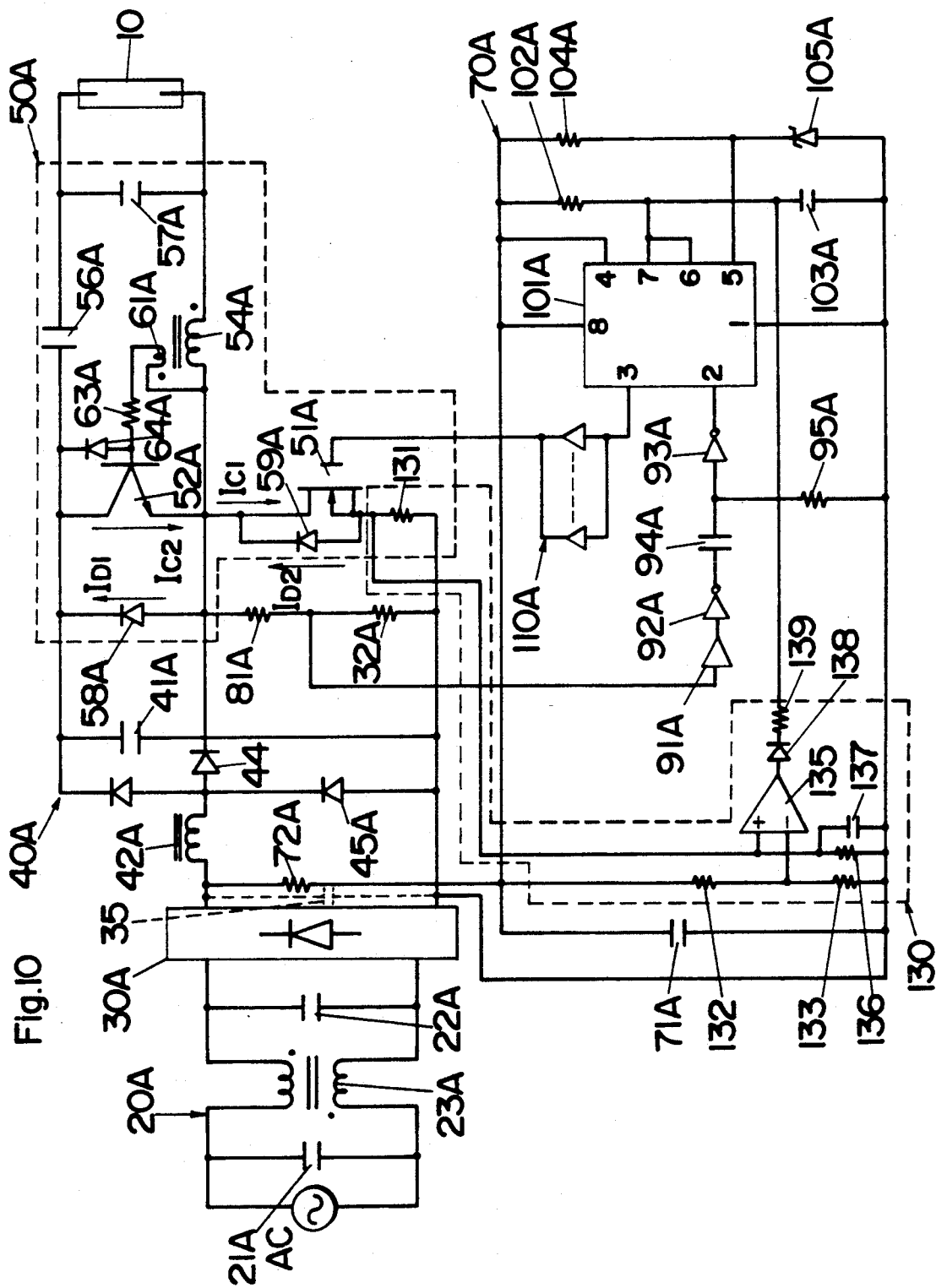
FIG. 10 is a circuit diagram of an inverter device in accordance with a second embodiment of the present invention.

Referring to FIG. 10, there is shown an inverter device in accordance with a second embodiment of the present invention which is basically identical in configuration and operation to the first embodiment. Therefore, like components are designated by like numerals with a suffix letter of "A". In this embodiment, a voltage sensor 130 is provided, instead of the input voltage detector 120 in the embodiment of FIG. 5, for detection of instantaneous failure or critical drop in the AC line voltage. The sensor 130 comprises a resistor 131 connected in series with MOSFET 51A, a comparator 135, and resistors 132 and 133 connected across capacitor 71A which is connected through a resistor 72A to rectifier 30A to provide a control DC voltage V71 to energize the controller 70A. Resistor 131 is coupled with parallel combination of resistor 136 and capacitor 137 to provide a detected voltage determined thereby to noninverting input of comparator 135 which receives at its inverting input a reference voltage obtained by resistor network of 132 and 133. Thus, voltage sensor 130 operates to constantly monitor current IC1 flowing through MOSFET 51A in terms of its attendant voltage. When MOSFET 51A sees considerably prolonged on-duty period to flow abnormally increased current Ic1 as a result of that input AC line voltage instantaneously fails or instantaneously drops critically, the detected voltage goes over the reference voltage so as to cause comparator 135 to generate high level output which is applied through diode 138 and resistor 139 to rapidly charge timing capacitor 103A, thereby reducing on-time duration of MOSFET 51A for avoiding abnormal inverter oscillation in the same manner as described in the above With reference to input voltage detector 120 of FIG. 5.

Figure 11:
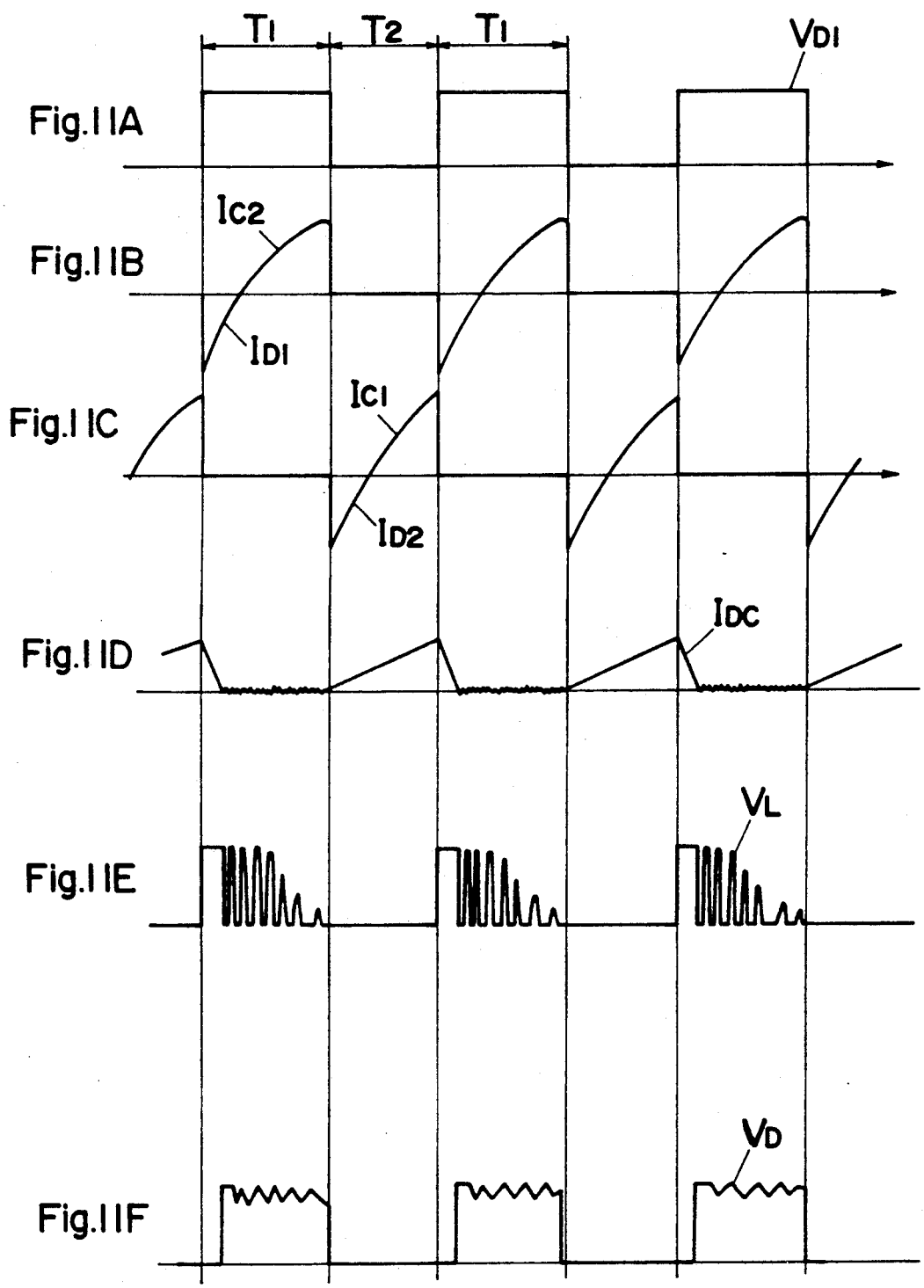
FIG. 11(A-F) are wave-forms illustrating an operation of the circuit of FIG. 10.

In this embodiment, diode 44 is inserted between choke coil 42A and MOSFET 51A in order to make rectifier 30A substantially free from high frequency switching voltage developed across MOSFET 51A as well as from high frequency oscillating voltage VL which is developed across choke coil 42A due to even less residual energy remaining after seeing no current therethrough. FIG. 11, composed of FIGS. 11A to 11F, shows wave-forms of currents and voltage seen in the inverter operation of this embodiment, wherein:

FIG. 11A is for voltage VD1 applied across MOSFET 51A with time period indications T1 within which MOSFET 51A is off (second transistor 52A is on) and T2 within which MOSFET 51A is on (second transistor 52A is off);

FIG. 11B for current IC2 through second transistor 52A and current ID1 through first diode 58A;

FIG. 11C for current IC1 through MOSFET 51A and current ID2 through parasitic diode 59A of MOSFET 51A;

FIG. 11D for current IDC flowing through choke coil 42A and diode 44;

FIG. 11E for voltage VL developed across choke coil 42A; and

FIG. 11D for voltage VD applied across diode 44.

Figure 12:
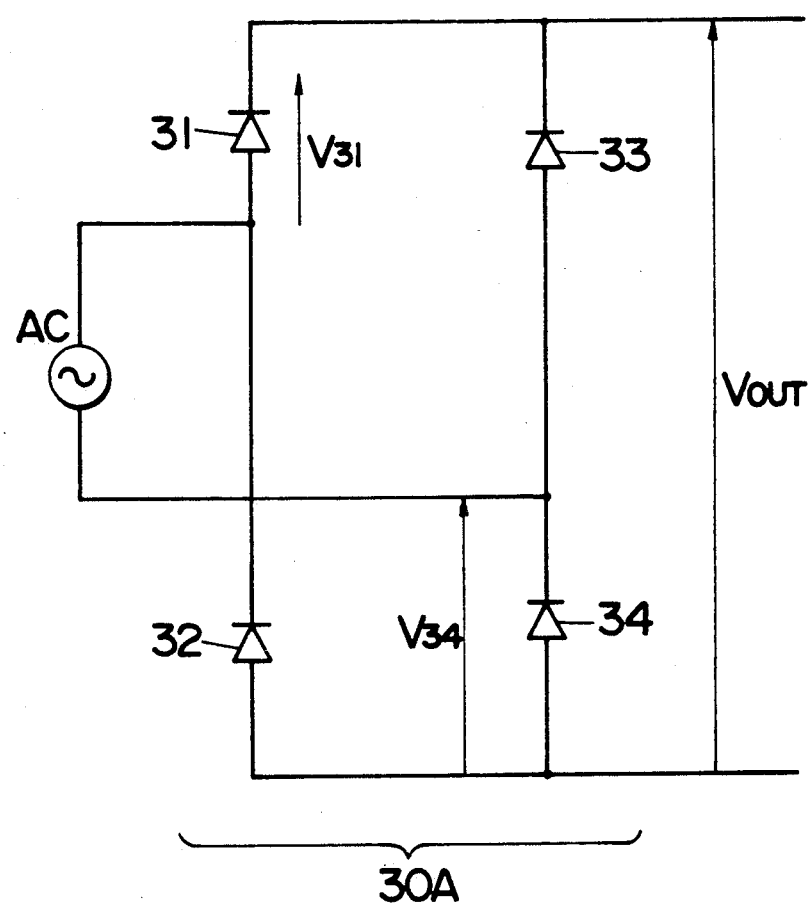
FIG. 12 is a circuit diagram of a full-wave rectifier of FIG. 10.
Figure 13:
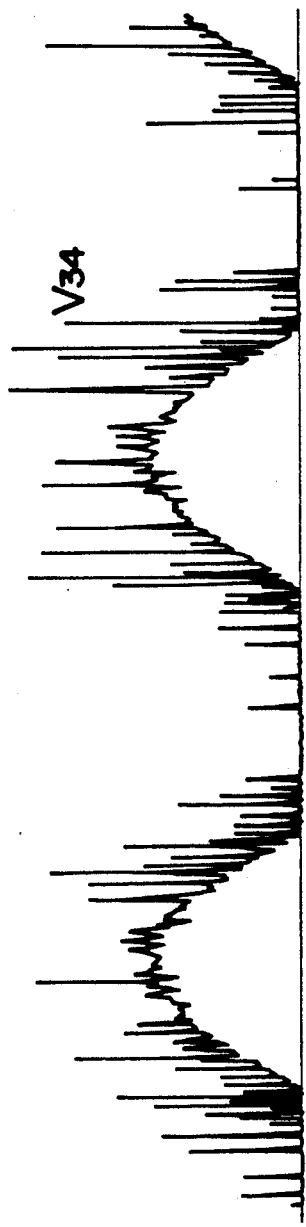
FIGS. 13 to 15 are respectively wave-form charts illustrating DC voltages applied in and at the output of the rectifier of FIG. 12.
Figure 14:
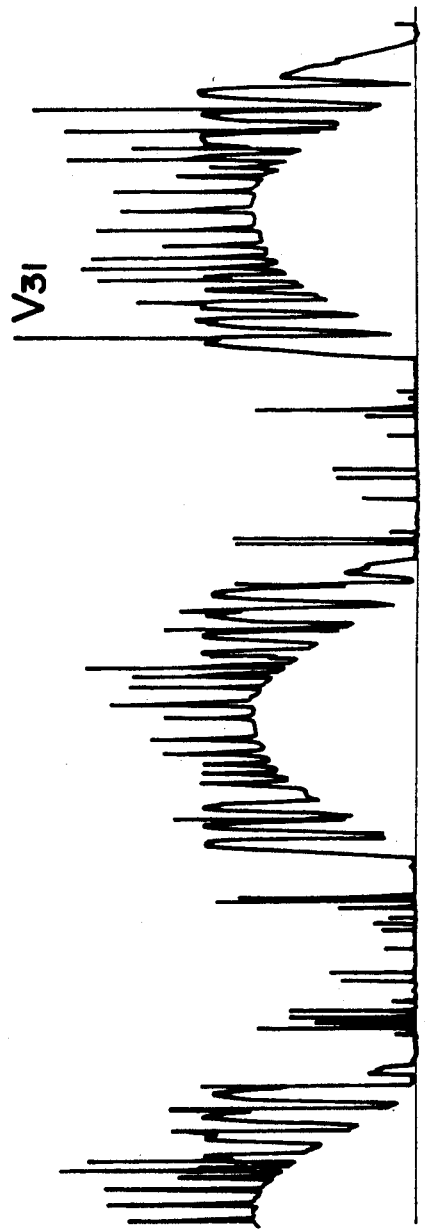
Figure 15:
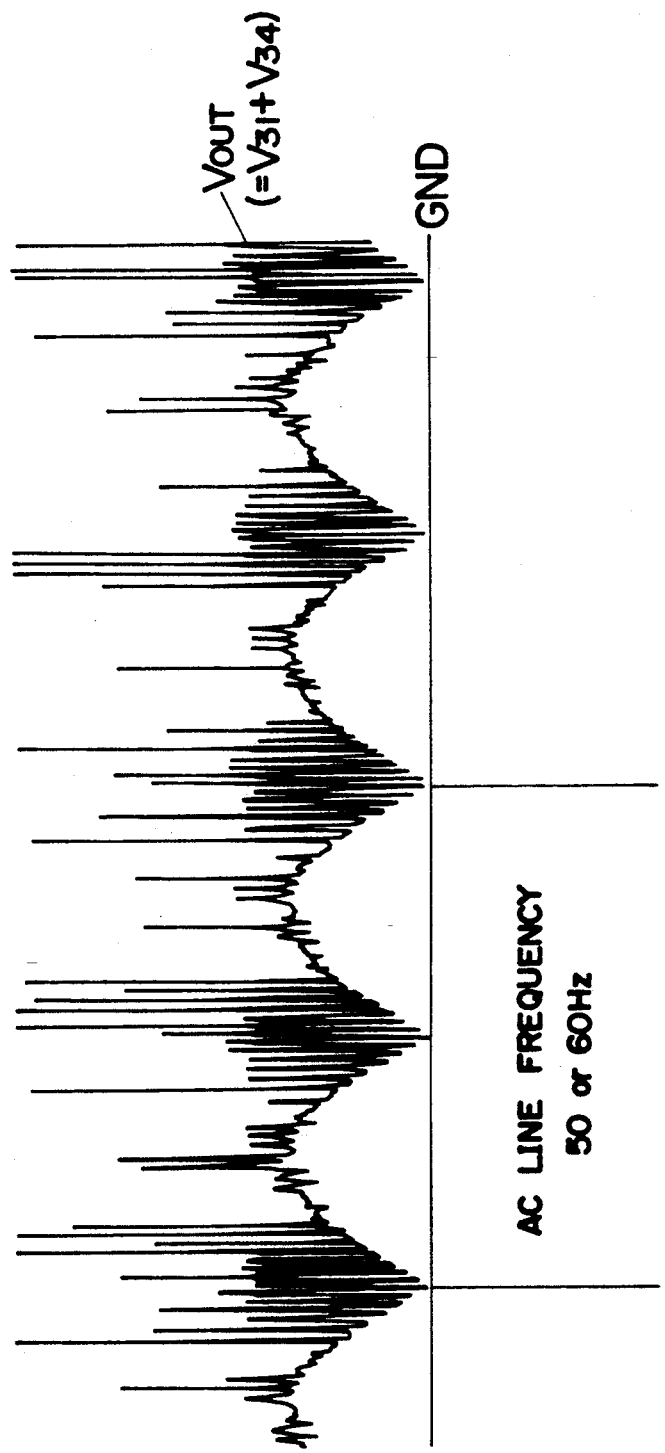

As shown in FIG. 11E, although choke coil 42A suffers from high frequency voltage VL in the inverter operation, such voltage is only applied to diode 44 as VD (FIG. 11F) but not applied back to rectifier 30A as the high. Therefore, rectifier 30A can be protected from such high frequency voltages, eliminating the necessity of utilizing high voltage-resistive diodes as forming full-wave rectifier 30A in the form of diode bridge, as shown in FIG. 12. The above effect of diode 44 can be readily confirmed with reference to FIGS. 12 to 15. Considering that rectifier 30A consists of four diodes 31 to 34 in bridge configuration, as shown in FIG. 12, there applied across diode 34 and diode 31 respectively voltages V34 and V31, respectively shown in FIGS. 13 and 14, which include high frequency components resulting from the high frequency switching of MOSFET 51A as well as from high frequency oscillating voltage VL developed across choke coil 42A. Consequently, rectifier 30A of diode bridge will have at its output ends a resulting voltage Vout with such attendant high frequency components, as shown in FIG. 15, of which level is considerably greater than that of input AC line voltage. Without diode 44, therefore, diodes 31 to 34 of rectifier 30A should have enough resistance to such higher voltage and accordingly be expensive ones. Further, additional diode 45 may be inserted in series with choke coil 42A across the output ends of rectifier 30A with its cathode connected to a point between choke coil 42A and diode 44. This diode 45 releases residual energy remaining slightly in choke coil 42A through floating capacity 35 of rectifier 30A or through capacitor 23A of filter 20A to thereby block oscillating voltage developed at choke coil 42A in the opposite direction, and as well reduces voltage applied across diode 44 so as to allow the use of less voltage resistance. In addition, since diode 45 itself sees only minute current (as less as tens of mA), it can be of less voltage resistance. Such diode 44 and 45 may be inserted in circuit of FIG. 5.

Third Embodiment

Figure 16:
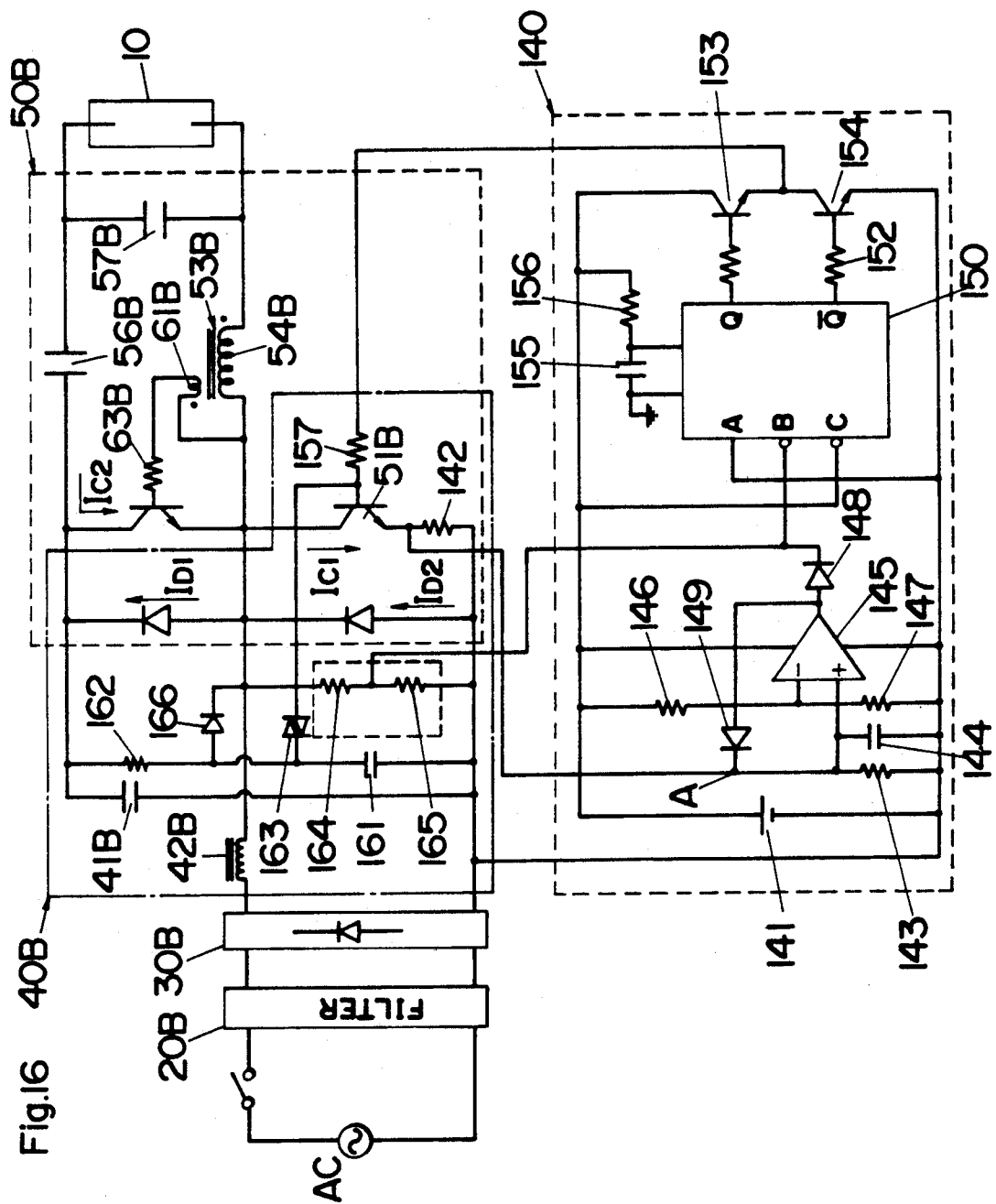
FIG. 16 is a circuit diagram of an inverter device in accordance with a third embodiment of the present invention.

FIG. 16 shows an inverter device in accordance with a third embodiment of the present invention which is basically similar in configuration and operation to the first embodiment but is started and controlled somewhat differently. Therefore, like components are designated by like numerals with suffix letter of "B".

A controller 140 for controlling on-time duration of first transistor 51B comprises a battery 141 providing a control DC voltage and a monostable multivibrator 150 with its Q output and $\bar{Q}$ output connected through resistors 151 and 152 respectively to drive transistors 153 and 154. Upon receiving a trigger input, multivibrator 150 is set to provide high level signal at Q output and low level signal at $\bar{Q}$ output for a fixed time interval determined by a timing capacitor 155 and resistor 156. Drive transistors 153 and 154 are connected in series with collector of transistor 153 connected to positive pole of battery 141 and with emitter of transistor 154 to negative pole of battery 141. The point between emitter of transistor 153 and collector of transistor 154 is connected to base of first transistor 51B through resistor 157 so as to turn on second transistor 51B for an on-time duration determined by capacitor 155 and resistor 156. In this sense, multivibrator 150 acts as a timer for determining on-time duration of first transistor 51B, which duration can be varied externally by selecting values of timing capacitor 155 and resistor 156.

A starter circuit comprises a capacitor 161 in series with resistor 162 across smoothing capacitor 41B and two-terminal thyristor 163 connected to base of first transistor 51B. Also included in the circuit is a voltage divider of resistors 164 and 165 which is connected across first transistor 51B to provide a divided voltage representative of voltage being applied across first transistor 51B to trigger input (indicated by B) of multivibrator 150. When rectifier 30B provides pulsating DC voltage upon receiving AC line voltage through filter 20B, it causes a current to flow through choke coil 42B, first diode 58B and smoothing capacitor 41B to charge smoothing capacitor 41B, which in turn charges capacitor 161 through resistor 162. As soon as capacitor 161 is charged up to a break-over voltage of thyristor 163, thyristor 163 is conductive to give forward bias to thereby turn on first transistor 51B. Once first transistor 51B is on, divided voltage from voltage divider 164 and 165 is reduced to zero in response to that no voltage is applied across first transistor 51B, whereby trigger input (B) of multivibrator 150 is turned from "high" to "low" level such that multivibrator 150 comes into set state to have high level Q output and low level $\overline{Q}$ output for turning On transistor 153 and turning off transistor 154, therefore giving bias to first transistor 51B from battery 141. With this result, first transistor 51B is kept turned On for on-time duration determined by timing capacitor 155 and resistor 156, during which diode 166 acts to divert current through first transistor 51B, preventing capacitor 161 from being charged thereby and therefore disabling starter circuit. In this condition, current Ic1 is caused to flow from smoothing capacitor 41B through series oscillation circuit of first capacitor 56B, load 10, second capacitor 57B, primary winding 54B of transformer 53B, first transistor 51B and back to smoothing capacitor 41B, while charging first capacitor 56B thereby. While such current Ic1 flows, second transistor 52B is kept turned off due to negative voltage being applied thereto from feedback winding 61B, for the reason as explained in the first embodiment.

Figure 17:
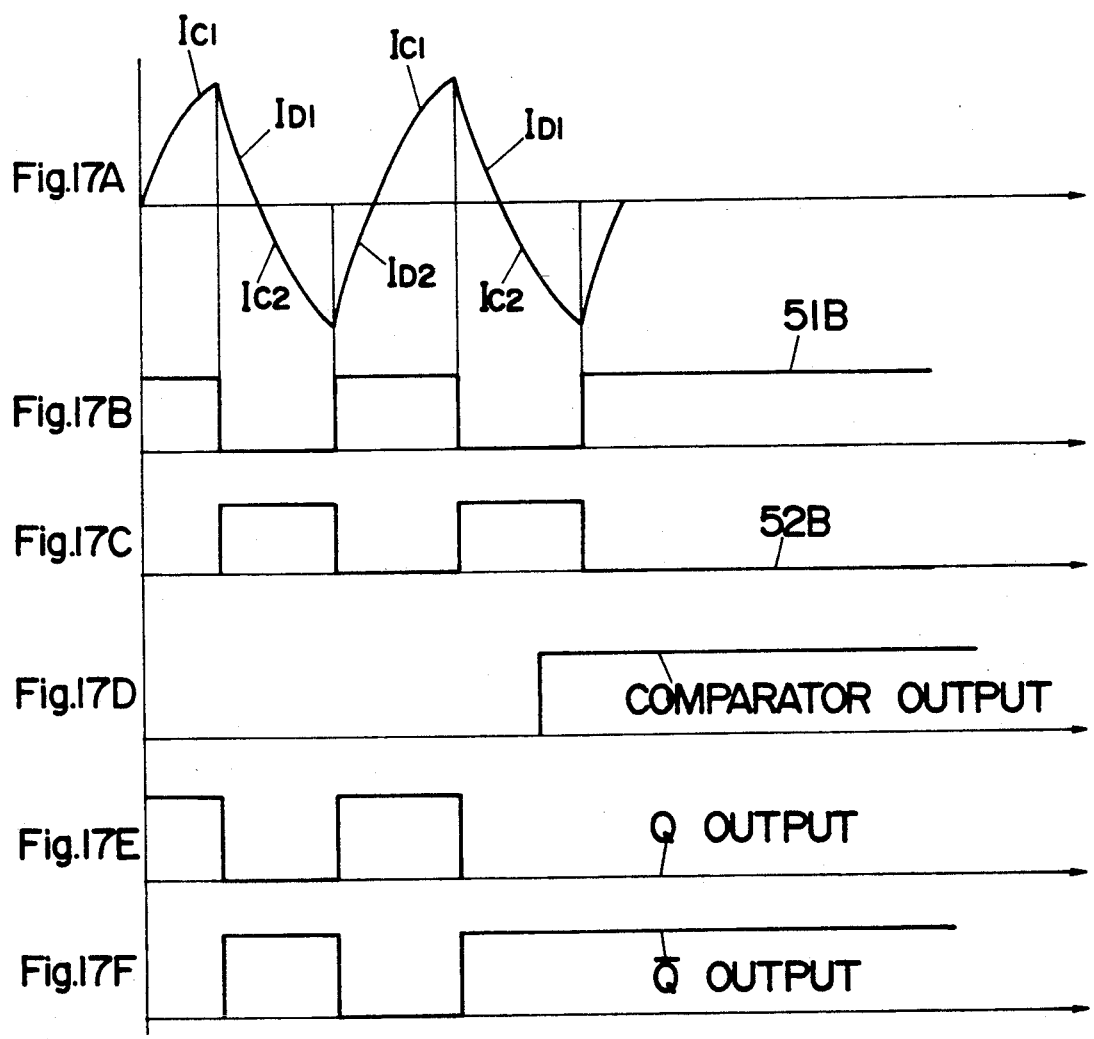
FIGS. 17(A-F) are wave-forms illustrating an operation of the circuit of FIG. 16.

When first transistor 51B is turned off as a consequence of multivibrator 150 returns to its reset state to provide low level Q output and high level $\overline{Q}$ output, primary winding 54B acts to continue flowing current IC1 through first diode 58B, as shown in FIG. 17A, and at the same time feedback winding 61B induces a biasing voltage to second transistor 52B in response to decreasing current flow through primary winding 54B. Immediately after current ID1 becomes zero, second transistor 52B becomes conductive to flow current IC2 from capacitor 58B, second transistor 52B, series oscillation circuit of primary winding 54B, load 10, capacitor 57B, and back to capacitor 56B, as shown in FIG. 17A. Current IC2 is allowed to flow for a fixed on-time duration internally determined by circuit constant of oscillation circuit itself, as explained in detail with reference to the first embodiment. Upon turn off of second transistor 52B, primary winding 54B again acts to continue flowing current ID2 through load 10, capacitor 57B, capacitor 56B, smoothing capacitor 41B, second diode 59B. Due to this current ID2 flowing past first transistor 51B, voltage across first transistor 51B is decreased to zero such that divided voltage from voltage divider 164 and 165 is again reduced to zero, changing trigger input (B) of multivibrator 150 from "high" to "low" level. Whereby, multivibrator 150 comes into set state to give forward bias to first transistor 51B. Consequently, first transistor 51B becomes conductive immediately after current ID2 is decreased to zero to again flow current IC1 therethrough. These steps are repeated to effect inverter operation of providing high frequency oscillating current to load 10, in much the same Way as in the first embodiment. Although first transistor 51B is illustrated as a bipolar transistor in this embodiment of FIG. 16, it is equally possible to use a MOSFET instead as illustrated in FIG. 10 of the second embodiment.

In order to sense current IC1 flowing through first transistor 51B, a resistor 142 is connected in series with first transistor 51B. Resistor 142 is connected to resistor 143 and capacitor 144 to provide a resulting smoothed detection voltage V144 to noninverting input of a comparator 145 which receives at its inverting input a reference voltage Vref, a divided voltage of battery 141 through resistors 146 and 147. Comparator 145 comprises, for example, a single-source quad general operational amplifier available from NEC, Japan as μPC451, and has its output connected through diode 148 to trigger input (B) of multivibrator 150 as well as connected through diode 149 back to noninverting input of comparator 145 at point A. Operation of comparator 145 is as follows. The reference voltage Vref, is selected to be less than detection voltage V144 [Vref>V144] when the inverter is in normal operation of providing the oscillating current of which level may vary only within a tolerable range, so that comparator 145 provides a low level output at this normal condition which will not affect the above operation of multivibrator 150. However, when load is disconnected or load becomes aged to come into substantially no load condition as may seen in discharge lamp at its life-time end, first transistor 51B sees a considerably increased current which in turn increase the detection voltage V144 beyond the reference voltage Vref [Vref<V144]. At this occurrence, comparator 145 turns to provide a high level output. As the high level output is feedback through diode 149 to noninverting input, comparator 145 is latched to keep providing the high level output, as shown in FIG. 17D, to trigger input (B) of multivibrator 150, forcing it into reset state where Q output is kept at low level and $\overline{Q}$ output is at high level, as shown in FIGS. 17D and 17E. Thus. multivibrator 150 will not respond to provide a bias to first transistor 51B. Therefore, the inverter is forced to stop for protection of the circuit from such no load condition.

Fourth Embodiment

Figure 18:
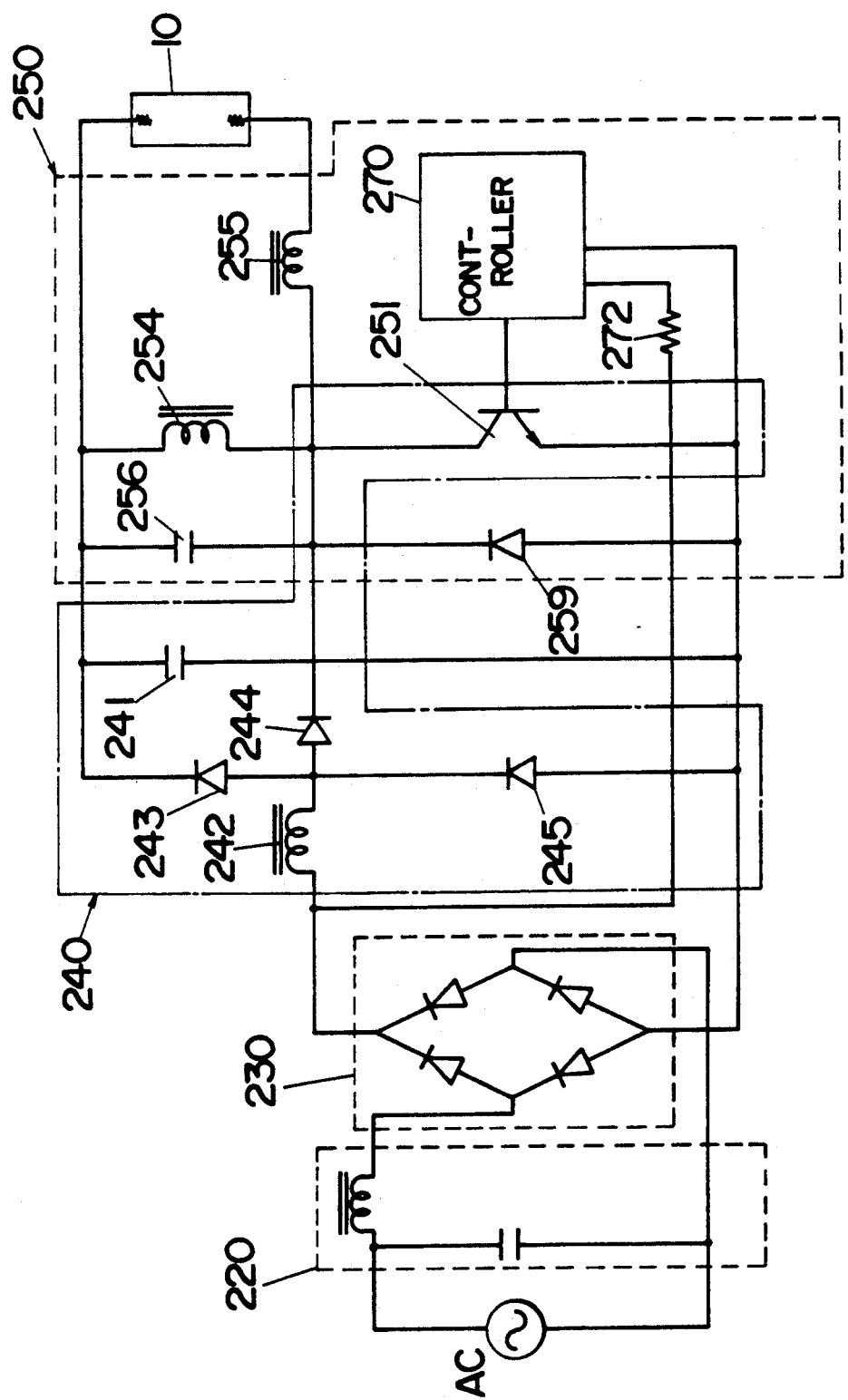
FIG. 18 is a circuit diagram of an inverter device in accordance with a fourth embodiment of the present invention.

FIG. 18 shows an inverter device in accordance with a fourth embodiment of the present invention which includes a smoothing circuit 240 of similar configuration and operation to the first embodiment but includes an inverter 250 of different configuration. A full-wave rectifier 230 receives AC line voltage through filter 220 to provide pulsating DC voltage. The smoothing circuit 240 comprises a smoothing capacitor 241, a choke coil 242, a switching transistor 251 and diode 243 to 245. Choke coil 242 and transistor 251 are connected in series across the smoothing capacitor 41 with diode 244 inserted between choke coil 242 and transistor 251, while smoothing capacitor 241 and diode 243 are connected in series across transistor 251. Transistor 251 operates to periodically switch or chop the pulsating DC voltage from rectifier 30 to store choke coil 242 with electromagnetic energy upon turn on of transistor 251 and then release the energy through diode 243 into smoothing capacitor 241 upon subsequent turn-off to thereby accumulate smoothed DC voltage to smoothing capacitor 241 in much the same manner as in the previous embodiments.

The inverter 250 shares transistor 251 with smoothing circuit 240 and further includes a diode 259 connected in anti-parallel with transistor 251, a parallel oscillation circuit of inductor 254 and capacitor 256, current limiting inductor 255. The parallel oscillation circuit is connected in series with transistor 251 across smoothing capacitor 241 such that transistor 251 switches smoothed DC voltage V241 at smoothing capacitor 241 to provide a high frequency oscillating voltage V254 across inductor 254, which is applied through current limiting inductor 255 to drive load 10. The above inverter operation is seen in FIG. 19, wherein:

FIG. 19A is for collector-emitter voltage VCE of transistor 251 with time period indications T1 within which transistor 251 is on and T2 within which transistor 251 is off;

FIG. 19B for voltage V241 at smoothing capacitor 241;

FIG. 19C for oscillating voltage V254 (=V241−VCE) being applied across inductor 254;

FIG. 19D for collector current Ic of transistor 251 and opposite current ID flowing through diode 259;

FIG. 19E for current IDC flowing through choke coil 242; and

FIG. 19F is for current IDC flowing through diode 243.

As seen from FIG. 19, each time transistor 251 is on, smoothed voltage V241 is applied to parallel oscillation circuit of inductor 254 and resistor 256, while choke coil 242 receives electromagnetic energy from rectifier 230, as shown in FIGS. 19C and 19E. Upon subsequent turn off of transistor 251, parallel oscillation circuit is allowed to apply across inductor 254 oscillating voltage V254, which is smoothed voltage V241 minus collector-emitter voltage VCE of transistor 251 (i.e., V254=V241−VCE), while choke coil 242 releases its energy as current IDC through diode 243, as shown in FIGS. 19C, 19E, and 19F. The above steps are repeated to produce the oscillating voltage V254 which oscillates at a nominal cycle determined by circuit constant of the circuit and is applied through inductor 255 to load 10. As apparent from the above, collector current IC (FIG. 19D) is a composite current of a resulting oscillating current flowing through inductor 254, capacitor 256, inductor 255, and load 10 plus the current IDC flowing through choke coil 242 and diode 244. It is noted that diode 259 sees a current ID in the opposite direction to collector current Ic, which current ID results from the oscillating current and becomes zero in a short time, as shown in FIG. 19D.

The controller 270 is of like configuration as shown in FIG. 5 of first embodiment or in FIG. 10 of second embodiment, and include a like multivibrator as a timer for determining on-time duration of transistor 251. The controller 270 is connected through resistor 272 to the output of rectifier 230 to have a control voltage necessary for the timer operation. Although not shown in the figure, controller 270 has means which senses current ID flowing through diode 259 in the opposite direction to current IC through transistor 251 for making transistor 251 conductive only after current ID becomes zero, as is seen in the previous embodiment. It is therefore equally possible in the present embodiment to vary on-time duration of transistor 251 within time interval T1 corresponding to a half of the nominal cycle inherent to the oscillating voltage at parallel oscillation circuit in order to regulate smoothed DC voltage being accumulated in smoothing capacitor 241 to a desired level in compensation for input AC voltage variation or changing load requirement. It is of course possible to include the safe guard means utilized in the previous embodiments against instantaneous input AC voltage failure or drop, or no load condition.

In the circuit of FIG. 18, diode 244 acts to block an undesirable current from flowing through a loop of diode 243, load 10, inductor 255, in addition to that it blocks the high frequency switching voltage of transistor 251 from being applied back to rectifier 230 as diode 44 does in the circuit of FIG. 10. Also diode 245 has the same effect of keeping rectifier 230 free from high frequency oscillating voltage developed across choke coil 242 as diode 45 does in the circuit of FIG. 10.

What is claimed is:

1. In an inverter device for providing a high frequency alternating voltage to a load, which comprises:
   a full-wave rectifier to provide a pulsating DC voltage from an input AC voltage;
   a smoothing circuit for receiving the rectifier output to provide a smoothed DC voltage, said smoothing circuit comprising a smoothing capacitor, choke coil means, and a switching element which operates to flow through said choke coil means current from said full-wave rectifier so as to supply the same with electromagnetic energy when it is turned on and release said electromagnetic energy into said smoothing capacitor when it is turned off to thereby accumulate said smoothed DC voltage across said smoothing capacitor;
   an inverter including the switching element which is common to said smoothing circuit for switching the smoothed DC voltage accumulated at said smoothing capacitor at a high frequency to apply a resulting voltage to a load circuit, said load circuit including said load, inductance and capacitor means to define an oscillation circuit which provides to said load an oscillating current composed of first and second currents flowing through said load in opposite directions to each other for effecting an inverter operation, said first and second currents alternating to flow for a nominal on-time duration determined by a circuit constant of said oscillation circuit itself; an improvement characterized in that said inverter device further comprises:
   a controller having detector means for detecting termination of said second current and exciting said common switching element at a timing dependent upon said termination of said second current so as to begin flowing said first current; and
   said controller having timer means for separately controlling an actual on-time duration for flowing said first current within said nominal on-time duration following the said nominal on-time duration of said second current, while leaving said second current to flow for a fixed time interval of said nominal on-time duration.

2. A inverter device as set forth in claim 1, wherein said controller has a control DC voltage smoothed from the output DC voltage of said rectifier in a proportional relationship thereto,
said timer means producing a duration signal which varies said actual on-time duration of said common switching element in inverse proportion to a deviation of the level of said control DC voltage from a standard level in a direction of keeping said smoothed DC voltage at a constant level.

3. A inverter device as set forth in claim 2, further including:
an input AC voltage detector connected in circuit to detect said input AC voltage applied to said full-wave rectifier, said input AC voltage detector providing a cut signal to said timer means when said detected AC voltage falls below a reference voltage, said timer means, in response to said cut signal, producing a duration signal of reducing said actual on-time duration of said common switching element.

4. An inverter device for providing a high frequency alternating voltage to a load, which comprises:
a full-wave rectifier to provide a pulsating DC voltage from an input AC voltage;

a smoothing circuit for receiving the rectifier output to provide a smoothed DC voltage, said smoothing circuit comprising a smoothing capacitor, choke coil means, and a first switching element which operates to flow through said choke coil means current from said full-wave rectifier so as to supply the same with electromagnetic energy when it is turned on and to release said electromagnetic energy into said smoothing capacitor when it is turned off to thereby accumulate said smoothed DC voltage across said smoothing capacitor;

an inverter including:

said first switching element common to said smoothing circuit;

a second switching element connected in series with said first switching element across said smoothing capacitor;

a load circuit connected across said second switching element, said load circuit including said load, an oscillation capacitor and inductance which define a series oscillation circuit;

said series oscillation circuit, in response to said first and second switching elements driven to alternately turn on and off at a high frequency for switching said smoothed DC voltage accumulated at said smoothing capacitor, providing an oscillating current composed of first and second current flowing through said load in opposite directions to each other for effecting an inverter operation, said first and second currents alternating to flow for a nominal on-time duration determined by a circuit constant of said series oscillation circuit itself;

said first switching element operating for switching said smoothed DC voltage to provide said first current through said load circuit while charging said oscillation capacitor thereby;

said second switching element connected to said series oscillation circuit to be self-excited in response to the termination of said first current to start flowing said second current from said oscillation capacitor through said series oscillation circuit and to continue flowing said second current for a fixed time interval of said nominal on-time duration;

said inverter device further including:

a controller having detector means for detecting termination of said second current and exciting said first common switching element at a timing dependent upon said termination of said second current so as to start flowing said first current; and said controller having timer means for separately controlling an actual on-time duration for flowing said first current within said nominal on-time duration following the said nominal on-time duration of said second current, while leaving said second current to flow for an fixed time interval of said nominal on-time duration.

5. An inverter device as set forth in claim 4, wherein said inverter including first and second diodes respectively connected in an anti-parallel relation across said second and first switching elements;

said first diode forming a first escape path through which said first current is allowed to flow continuously immediately after the turn-off of said first switching element;

said second diode forming a second escape path through which said second current is allowed to flow continuously immediately after the turn-off of said second switching element; and said detector means at said controller detecting said second current flowing through said second escape path so as to allow said first common switching element to become conductive for flowing said first current only after the termination of said second current.

6. An inverter device as set forth in claim 5, wherein said first common switching element is a MOSFET with a parasitic diode defining said second diode.

7. An inverter device as set forth in claim 5, further including a voltage dividing resistor network connected across said first common switching element to provide to said controller a start signal representative of the pulsating DC voltage of said rectifier, said controller responding to said start signal going lower than a predetermined threshold to excite said first common switching element to make it ready for conduction;

said voltage dividing network being also cooperative with said second diode to define current sensor means for sensing said second current flowing through said second diode in the opposite direction to said first current such that said voltage dividing network, in response to said second current flowing through said second diode, provides said start signal going lower than said threshold for excitation of said common switching element, thereby allowing said common switching element to become conductive to flow said first current therethrough immediately after said second current of opposite direction diminishes to zero.

8. An inverter device as set forth in claim 2, wherein said controller includes a voltage sensing resistor connected in series with said common switching element to sense a voltage developed across said resistor caused by said first current flowing through said inverter, and includes:

a comparator comparing said sensed voltage at said resistor with a reference voltage and providing a cut signal to said timer means when the former voltage becomes greater than the former voltage, said timer means in response to said cut signal operating to produce said duration signal of reducing the actual on-time duration of said common switching element.

9. An inverter device as set forth in claim 5, wherein said second switching element is a bipolar N-P-N transistor having P-N junction across its base and collector, and wherein said series oscillating load circuit includes a transformer with a primary winding defining said inductance connected in series with said oscillation capacitor and a secondary winding defining a feedback winding, said feedback winding connected to the base of said second switching transistor and is magnetically coupled to said inductance with its polarity chosen in relation to the winding sense of said inductance such that said feedback winding induces a self exciting trigger voltage to the base of said second switching transistor in response to said inductance seeing the polarity reversal of said oscillating current from said first current to said second current;

said feedback winding connected across the base-emitter path of said second switching transistor and in series with said choke coil means to form an additional path which allows a fraction of the current flowing from said choke coil means upon turning off of said first switching element to flow through said feedback winding, the base-collector P-N junction of said second switching transistor to said smoothing capacitor for providing an opposing current to said second switching transistor, said opposing current inhibiting said second switching transistor from become conducive to start flowing said second current until said opposing current diminishes to zero, whereby delaying the turn-on timing of second switching transistor and lowering a switching frequency of said inverter.

10. An inverter device as set forth in claim 9, further including
a diode connected across said base-collector path of said second switching transistor in such a manner as to provide a second additional path which allows said fraction of the current from said choke coil means to partially flow through said feedback winding to said smoothing capacitor, reducing said opposing current flowing through basecollector of said second switching transistor.

11. An inverter device as set forth in claim 5, wherein said controller further including:
a voltage dividing resistor network connected across said first common switching element to provide to said controller a start signal which is a fraction of the pulsating DC voltage of said rectifier such that, in response to said start signal going lower than a predetermined threshold, said controller operates to excite said first common switching element to make it ready for conduction;
said voltage dividing network being also cooperative with said second diode to define current sensor means for sensing said second current flowing through said second diode in the opposite direction to said first current such that said voltage dividing network, in response to the second current flowing through said second diode, provides said start signal going lower than said threshold for excitation of said common switching element, thereby allowing said common switching element to become conductive to flow said first current therethrough immediately after said second current of opposite direction diminishes to zero;
a voltage sensing resistor connected in series with said first common switching element to sense a voltage developed across said resistor caused by said first current;
a comparator comparing said sensed voltage at said resistor with a reference voltage and providing a latched stop signal when the former voltage exceeds the latter voltage, said latched stop signal overriding said start signal for disabling to excite said common switching element to thereby keep it turned off.

12. An inverter device as set forth in claim 1 or 4, wherein
said smoothing circuit includes a blocking diode inserted in series between said choke coil means and said common switching element with its anode connected to said choke coil means for blocking undesired high frequency switching voltage produced at said common switching element from acting back on said rectifier.

13. An inverter device as set forth in claim 12, wherein
said smoothing circuit includes an escape diode connected across said rectifier with its cathode coupled to a point between said choke coil means and said blocking diode for escaping residual energy of said choke coil means therethrough.

14. An inverter device as set forth in claim 4, wherein said smoothing circuit includes a blocking diode inserted in series between said choke coil means and said common switching element with its anode connected to said choke means for blocking undesired high frequency switching voltage produced at said common switching element from acting back on said rectifier.

15. An inverter device for providing a high frequency alternating voltage to a load, which comprises:
a full-wave rectifier to provide a pulsating DC voltage from an input AC voltage;
a smoothing circuit for receiving the rectifier output to provide a DC voltage, said smoothing circuit comprising a smoothing capacitor, choke coil means, a bypass diode inserted in series therebetween which series combination is connected across said full-wave rectifier, and a switching element which operates to flow through said choke coil means current from said rectifier so as to supply the same with electromagnetic energy when it is turned on and to release said electromagnetic energy through said bypass diode into said smoothing capacitor when it is turned off to thereby accumulate a resulting smoothed DC voltage across said smoothing capacitor; an inverter including:
the switching element which is common to said smoothing circuit for switching said DC voltage accumulated at said smoothing capacitor at a high frequency;
a parallel oscillation circuit connected across said load, said parallel oscillation circuit including an oscillation capacitor and an inductance, said parallel oscillation circuit connected in series with said switching element across said smoothing capacitor such that, upon turn-on of said switching element, said parallel oscillation circuit is supplied with energy by a current flowing from said smoothing capacitor and that, upon turn-off of said switching element, it provides an oscillating voltage to said load which oscillates at a cycle determined by a circuit constant of said oscillation circuit, said oscillating voltage composed of first and second voltages each continuing for a nominal on-time duration substantially equal to a half of said cycle;
said oscillating voltage being cooperative with said DC voltage accumulated in said smoothing capacitor to apply a resulting oscillation AC voltage to said load for providing thereto an oscillating current;
said inverter device further comprises:
a blocking diode inserted in series between said switching element and said choke coil means with an anode of said blocking diode connected between a point between an anode of said bypass diode and said choke coil means;
a controller for controlling an actual on-time duration of said switching element within said nominal on-time duration in order to regulate said voltage accumulated in said smoothing capacitor at a desired level while keeping said oscillation AC voltage acting upon said load.

16. An inverter device as set forth in claim 15, wherein an escape diode is connected in series with said choke coil means across said rectifier with its cathode connected to a point between said choke coil means and said blocking diode.

* * * * *